(12) United States Patent
Iizaka et al.

(10) Patent No.: US 8,577,729 B2
(45) Date of Patent: Nov. 5, 2013

(54) SELF-CHECKOUT TERMINAL

(75) Inventors: Hitoshi Iizaka, Shizuoka (JP); Yoshiya Yamada, Shizuoka (JP); Osamu Tsuchiya, Shizuoka (JP); Norihiko Kurihara, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 14 days.

(21) Appl. No.: 13/540,556

(22) Filed: Jul. 2, 2012

(65) Prior Publication Data
US 2013/0006787 A1 Jan. 3, 2013

Related U.S. Application Data

(62) Division of application No. 11/811,790, filed on Jun. 12, 2007, now Pat. No. 8,239,268.

(30) Foreign Application Priority Data

Jun. 20, 2006 (JP) ................................ 2006-169861

(51) Int. Cl.
*G06Q 20/00* (2012.01)
(52) U.S. Cl.
USPC ............... 705/16; 705/23; 235/375; 235/383; 235/462.11
(58) Field of Classification Search
None
See application file for complete search history.

(56) References Cited

U.S. PATENT DOCUMENTS

| | | | |
|---|---|---|---|
| 5,115,888 A | 5/1992 | Schneider | |
| 5,494,136 A | 2/1996 | Humble | |
| 5,546,475 A | 8/1996 | Bolle et al. | |
| 5,883,968 A | 3/1999 | Welch et al. | |
| 6,005,959 A | 12/1999 | Mohan et al. | |
| 2004/0223663 A1 | 11/2004 | Cato | |
| 2004/0262391 A1 | 12/2004 | Harris et al. | |
| 2006/0131402 A1* | 6/2006 | Crockett et al. | 235/383 |
| 2006/0266824 A1 | 11/2006 | Hassenbuerger | |
| 2007/0158417 A1 | 7/2007 | Brewington | |

FOREIGN PATENT DOCUMENTS

| | | |
|---|---|---|
| JP | 07-141553 | 6/1995 |
| JP | 07-234971 | 9/1995 |
| JP | 09-245251 | 9/1997 |
| JP | 10-074287 | 3/1998 |

(Continued)

OTHER PUBLICATIONS

European Office Action dated Aug. 22, 2012, filed in European counterpart Application No. 07011771.8, 10 pages.
B. Richards, "Keep an Eye for Checkout Scanner Errors" Madison Capital Times; Jun. 28, 1997, p. 1.

(Continued)

*Primary Examiner* — M. Thein
(74) *Attorney, Agent, or Firm* — Patterson & Sheridan, L.L.P.

(57) ABSTRACT

An article code reading device optically reads a code symbol on an article, and decodes and outputs an article code. An image pickup image part picks up an image of an area of an article, the code symbol of which is read by the article code reading device, and outputs pickup image data. An article registration is executed by searching an article data file for a corresponding price for the article, and an extraction process extracts an exterior characteristic of an article from the pickup image data outputted by the pickup image part. A consistency is determined between a first data obtained based on the extraction process and a second data obtained based on an output from the article code reading device, and an alarm is generated when it there is not a consistency between the first data and the second data.

14 Claims, 28 Drawing Sheets

(56) References Cited

FOREIGN PATENT DOCUMENTS

| JP | 2004-086728 | 3/2004 |
|----|-------------|--------|
| WO | WO-95/04491 | 2/1995 |
| WO | WO-96/01454 | 1/1996 |

OTHER PUBLICATIONS

Chinese Office Action dated Jul. 31, 2009 (4 pages), and partial English translation thereof (2 pages), issued in counterpart Chinese Application Serial No. 2007101494475.

Japanese Office Action dated Apr. 26, 2011 in counterpart Japanese Patent Application No. 2007-134639.

* cited by examiner

| ARTICLE CODE | ARTICLE DISPLAY | PRICE | IMAGE DATA |
|---|---|---|---|
| 4900000000016 | xxxx | xxxx | |
| 4900000000023 | xxxx | xxxx | |
| 4900000000030 | xxxx | xxxx | |
| 4900000000047 | xxxx | xxxx | |

Fig. 7B

WDF

| ARTICLE CODE | PREDETERMINED WEIGHT (g) | DEFINITION OF WHETHER A WEIGHT CHECK IS EXECUTED OR NOT | ARTICLE PLACING LOCATION DEFINITION (COMMODITY BAGGING SKIP) | PERMISSIBLE VALUE TYPE DEFINITION | UPPER LIMIT PERMISSIBLE VALUE | LOWER LIMIT PERMISSIBLE VALUE | WEIGHT UPDATE FLAG |
|---|---|---|---|---|---|---|---|
| 4900000000016 | 100 | 1: EXECUTE | 0: NOT EXECUTE | 0: % | 10 | 10 | 1: AUTOMATICALLY UPDATED |
| 4900000000023 | 100 | 1: EXECUTE | 0: NOT EXECUTE | 0: % | 10 | 10 | 0: NOT UPDATED YET |
| 4900000000030 | 310 | 1: EXECUTE | 0: NOT EXECUTE | 0: % | 10 | 10 | 1: AUTOMATICALLY UPDATED |
| 4900000000047 | 400 | 1: EXECUTE | 0: NOT EXECUTE | 1: WEIGHT (g) | 20 | 10 | 1: AUTOMATICALLY UPDATED |
| 2111100000017 | 500 | 1: EXECUTE | 0: NOT EXECUTE | 0: % | 0 | 0 | 1: AUTOMATICALLY UPDATED |
| 2012300000015 | | 0: NOT EXECUTE | 0: NOT EXECUTE | 0: % | 0 | 0 | 0: NOT UPDATED YET |

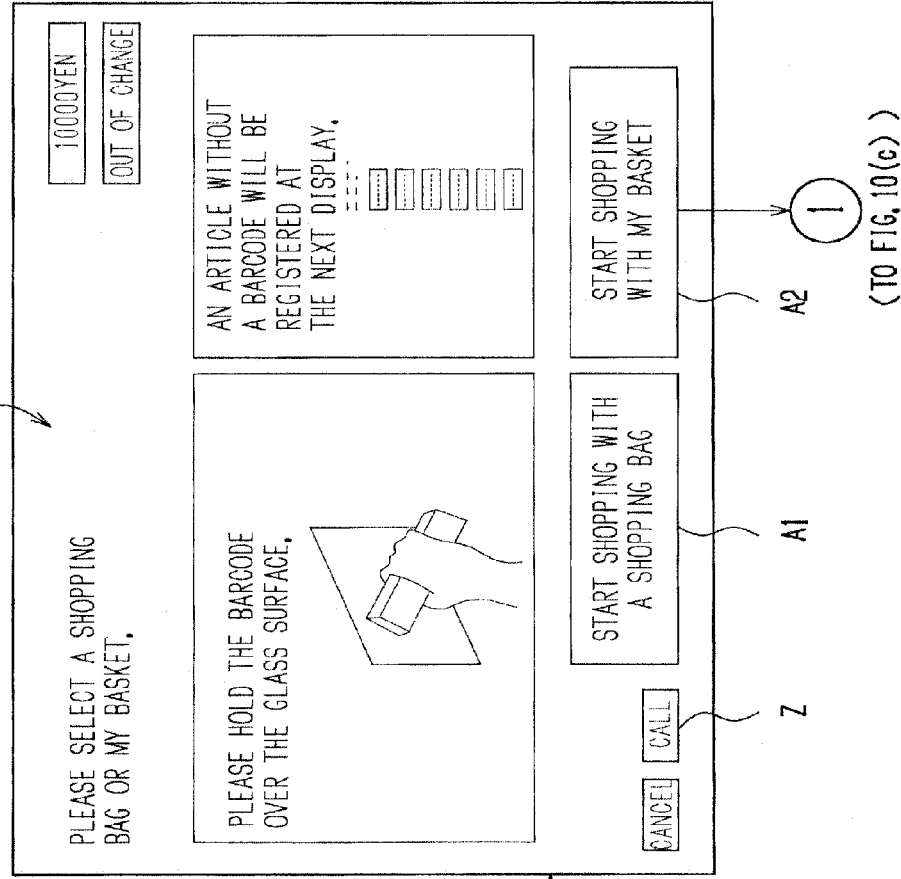

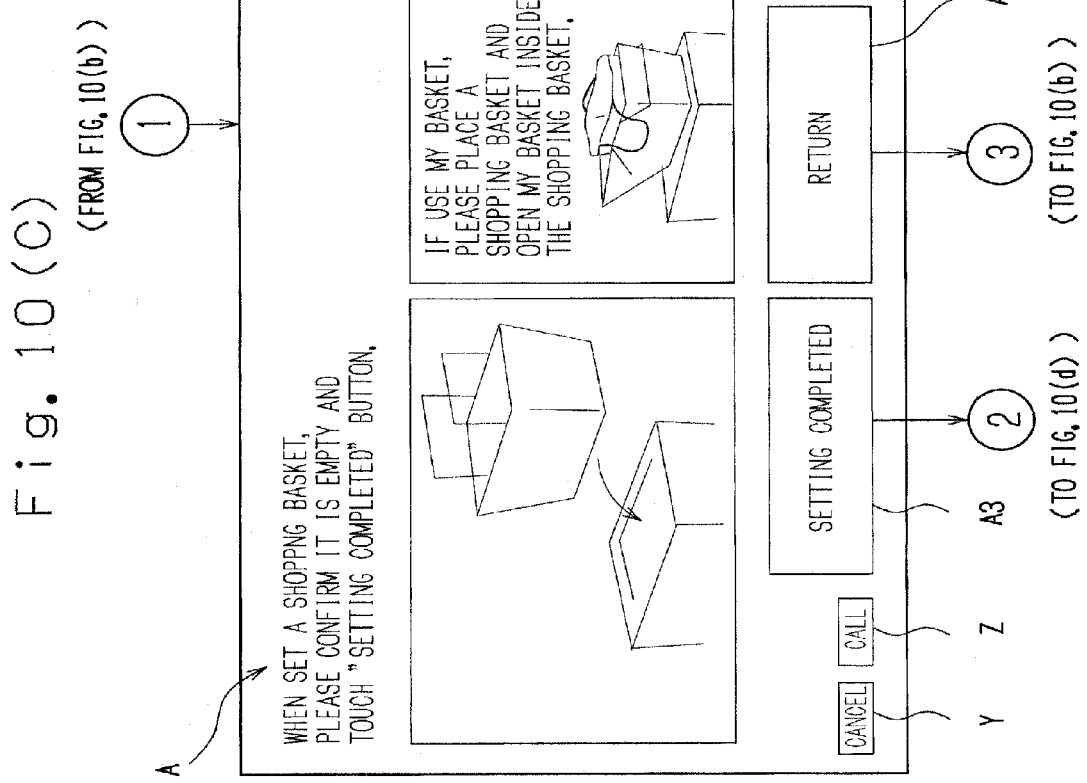

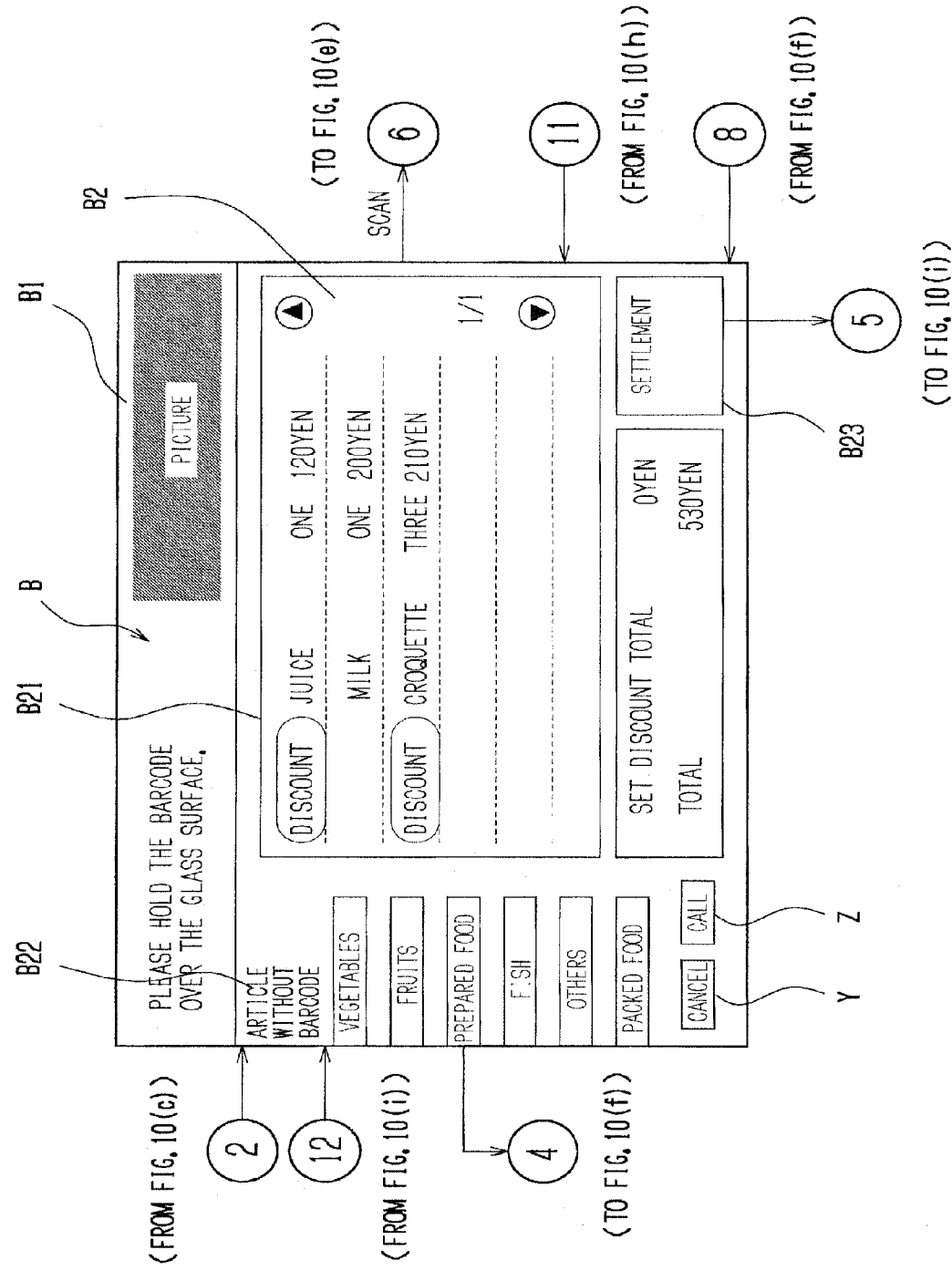

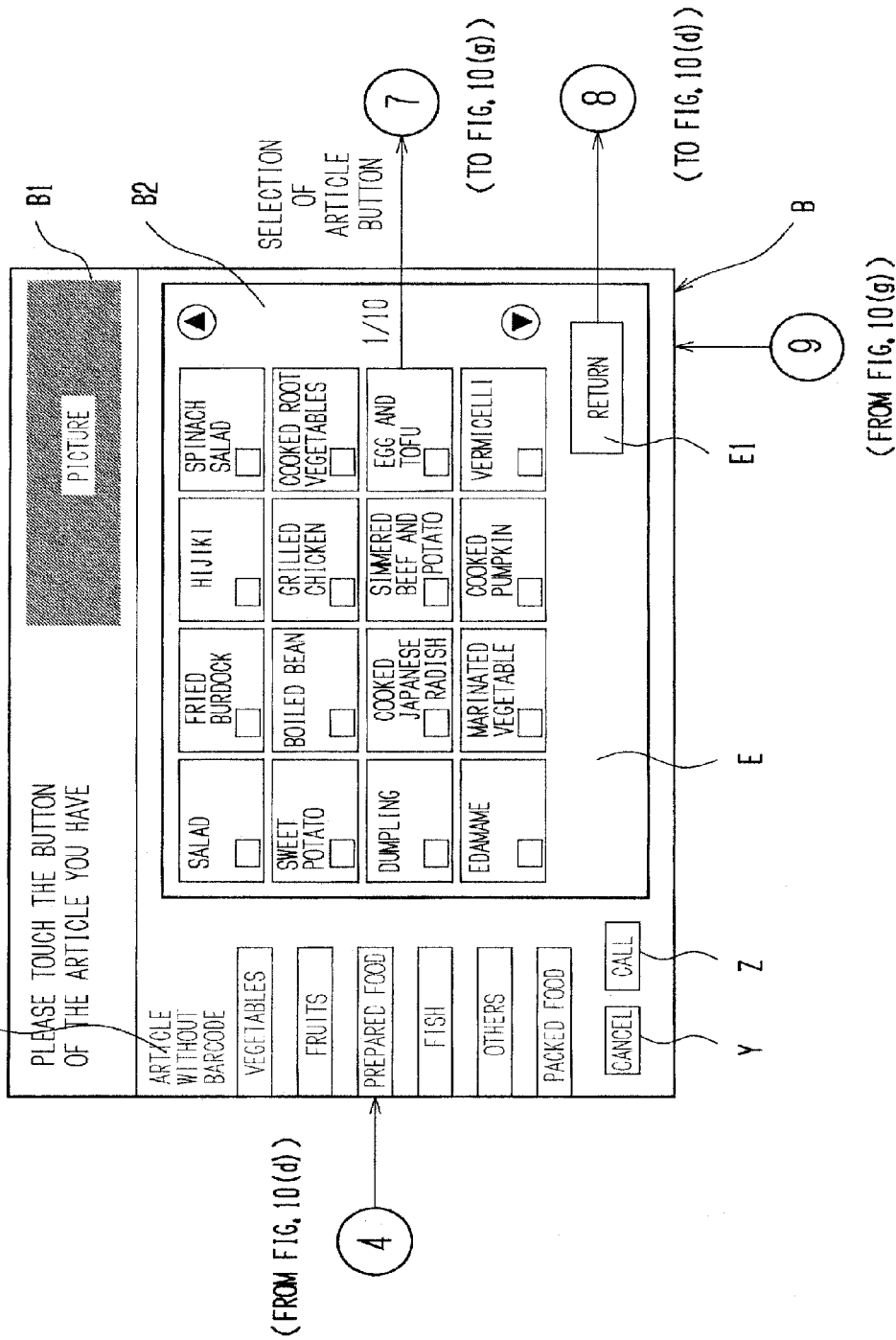

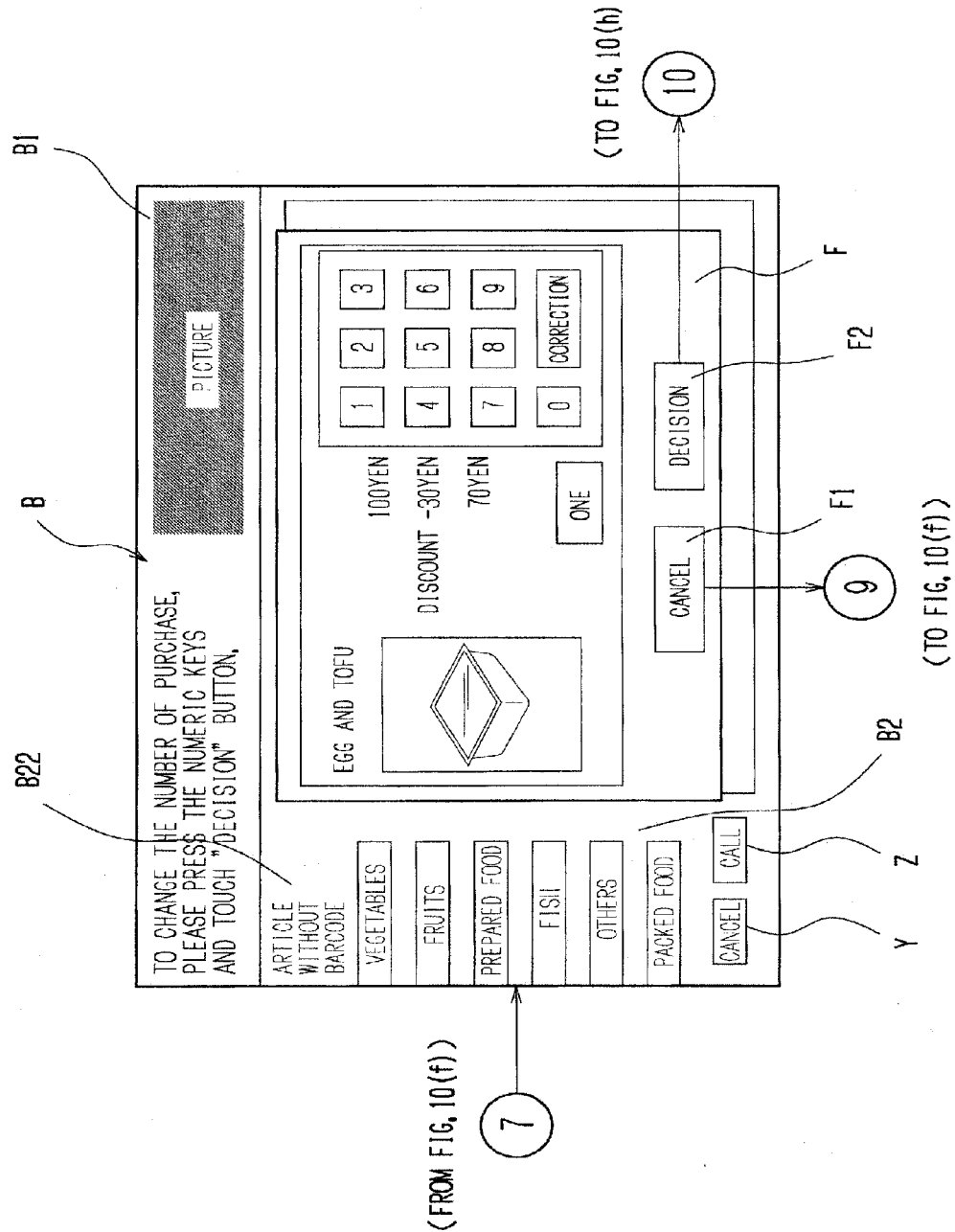

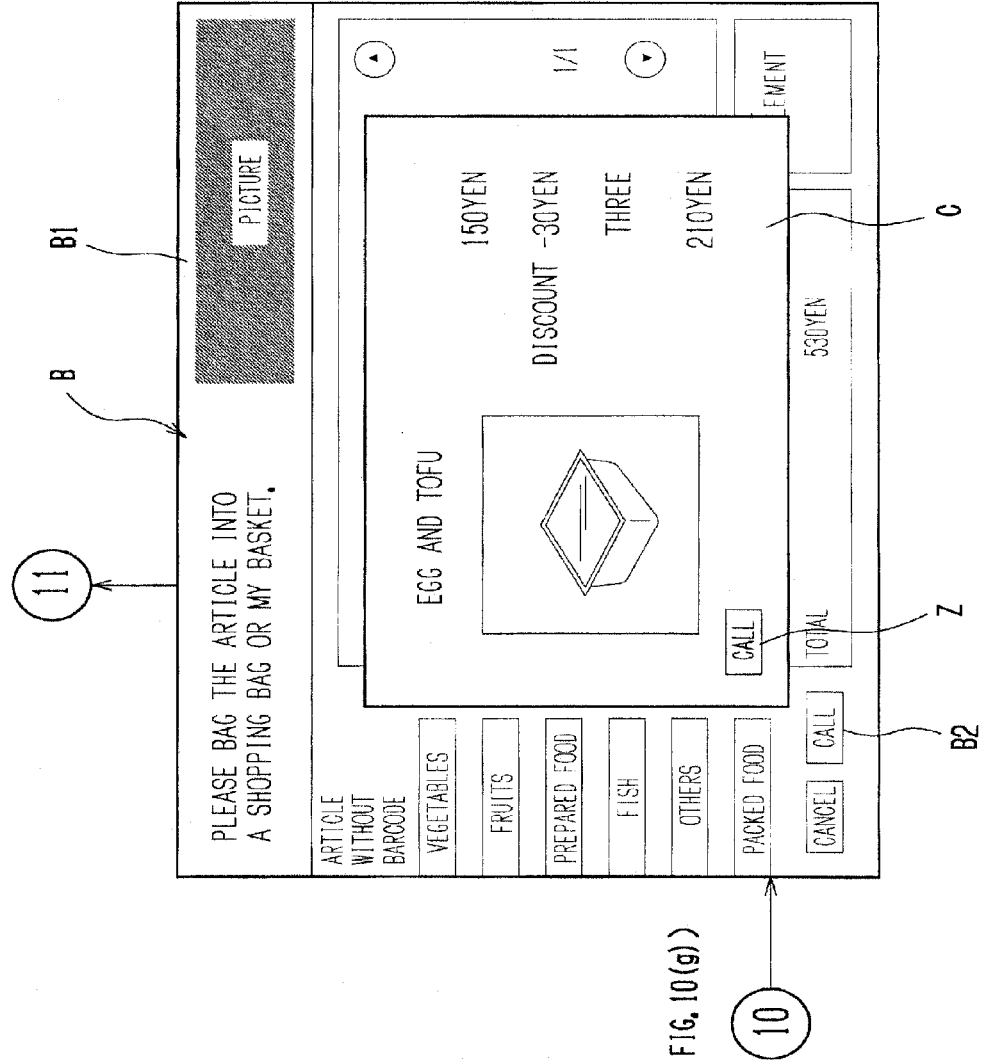

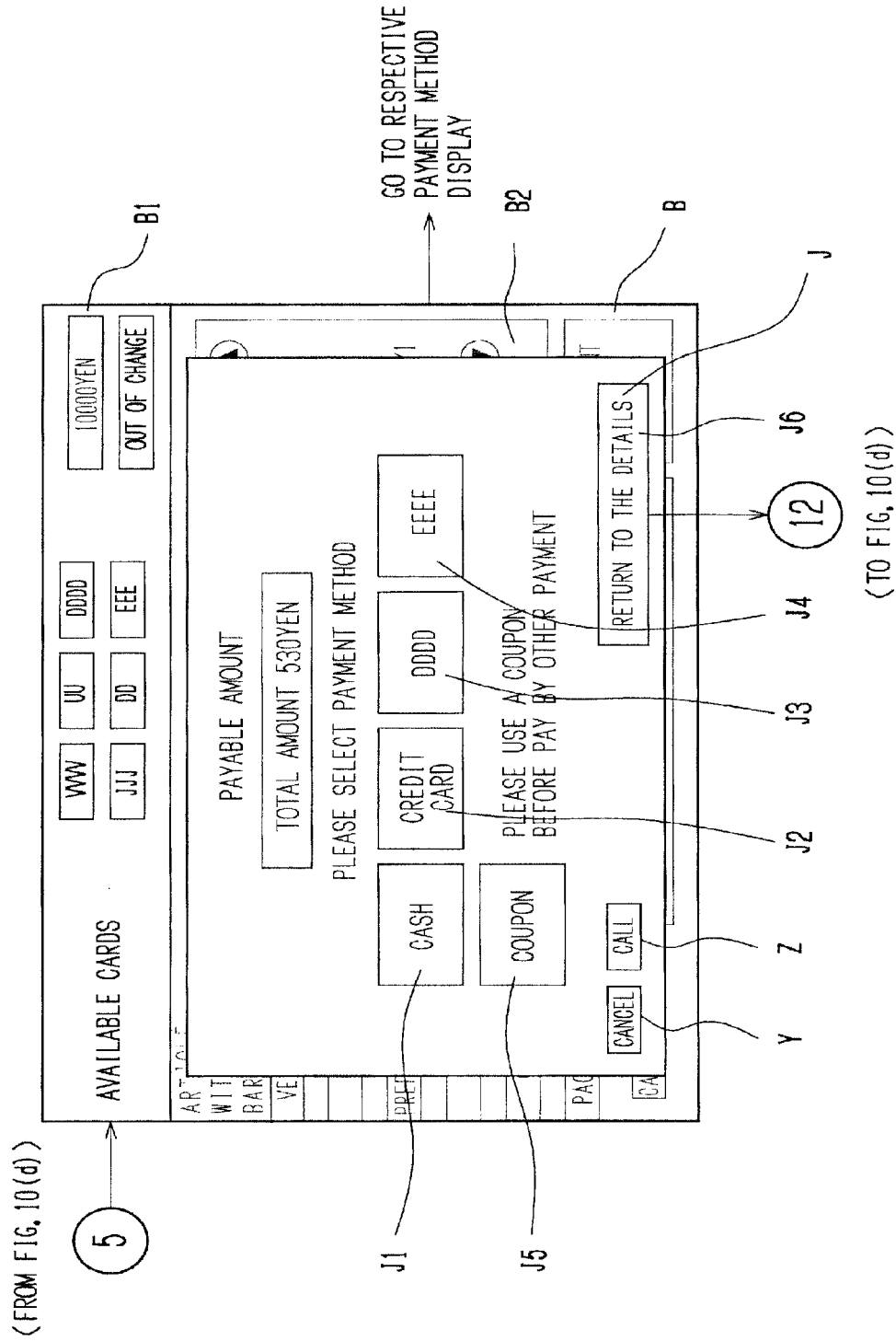

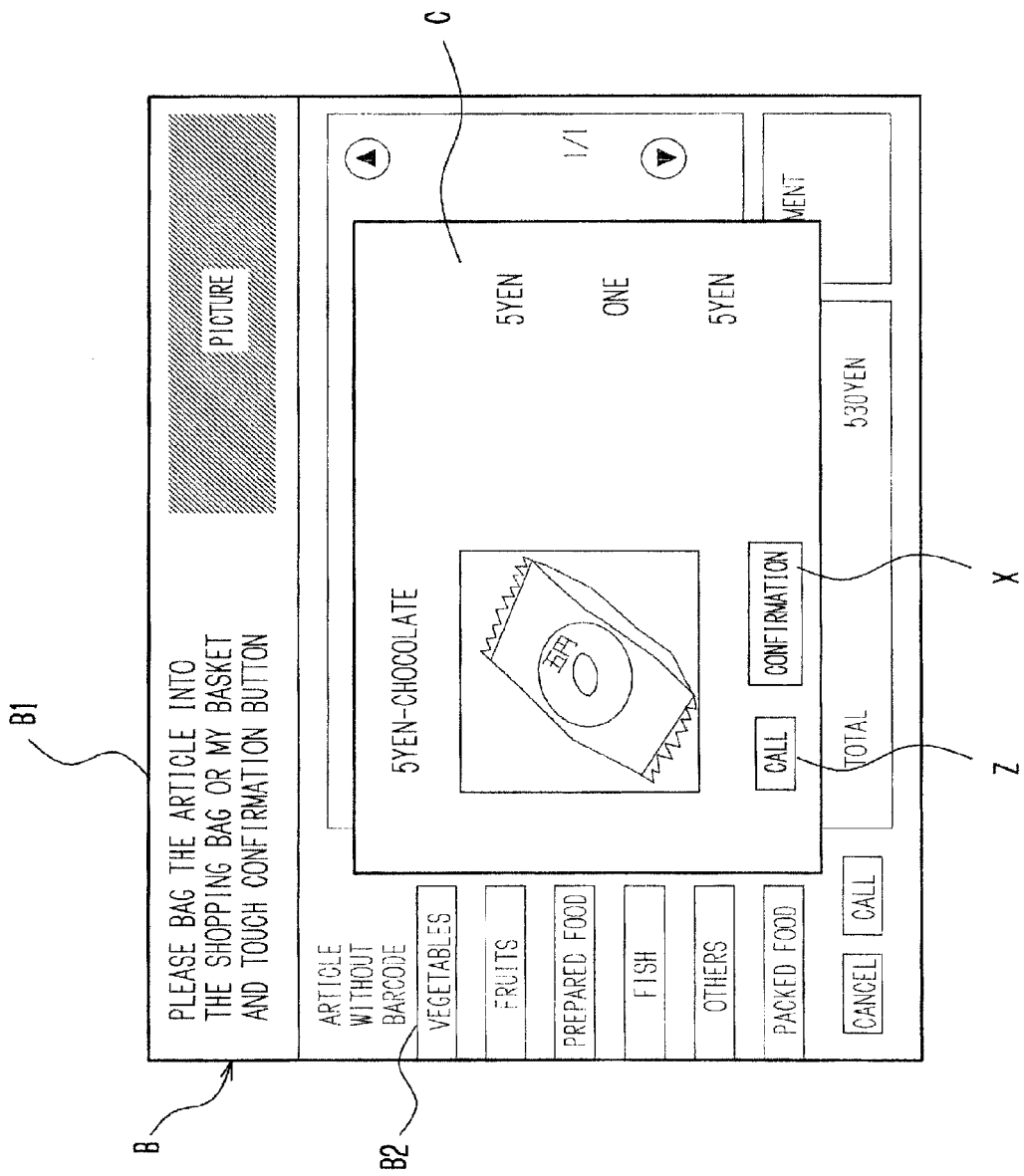

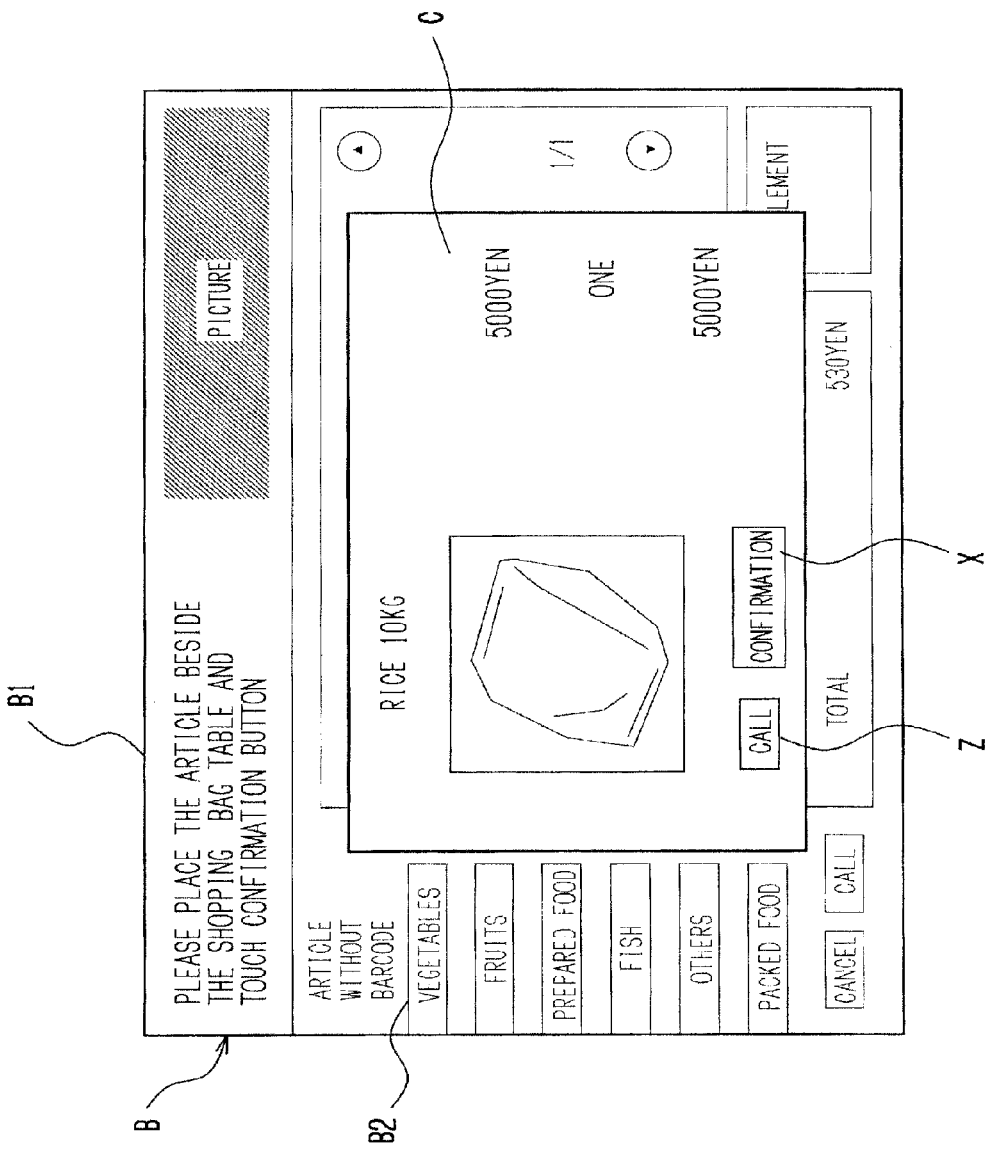

SELF-CHECKOUT TERMINAL

CROSS REFERENCE TO RELATED APPLICATION

The present application is a divisional of U.S. patent application Ser. No. 11/811,790, filed Jun. 12, 2007 now U.S. Pat. No. 8,239,268, which is based on Japanese Priority Document 2006-169861 filed on Jun. 20, 2006, the content of which is incorporated herein by reference.

BACKGROUND OF THE INVENTION

1. Field of the Invention

This invention relates to a self-checkout terminal, which enables a customer to execute a self-checkout.

2. Discussion of the Background

In recent years, a self-checkout terminal, which enables a customer to execute a self-checkout, has been developed. Various user interfaces for executing an article sales data processing are arranged such that an operation by a customer, information offering for the customer, and a receipt issuance are enabled. As the various user interfaces, it is provided that an article code reader such as a barcode reader or the like, a display for displaying information, an input part for inputting information, a settlement part for enabling a settlement such as a receiving/dispensing device for coins and bank notes, a receipt printer, and so on.

Further, a measurement is required to prevent a wrongdoing, that is, an article which a customer can bring home should be limited to the article, an article code of which was read by the article code reader. In other words, an article should be limited to the purchased article through the article sales data processing. As for such measurement, Japanese Laid-Open Publication No. Hei 09-245251 discloses a technology that prevents a wrongdoing by checking a weight of the article, the article code of which was read by the article code reader. A technique disclosed in the Japanese Laid-Open Publication No. Hei 09-245251 is to acquire weight data of an article from a PLU (Price Look-Up) file and so on based on an article code, which is read by the article code reader, to weigh the weight of the article after the article code was read, and to execute a weight check to see an identity between the weight specified by the weight data and the actual weighed weight.

However, the technique of the weight check described above may be inappropriate, or such technique may not be adopted from the beginning. Reasons will be stated as follows.

Weights of articles are not constant, and there are various articles, the weights of which are heavy such as 10 kilograms to light such as some grams. To weigh a weight of an article, the article is needed to be placed on an article placing table, which constitutes a scale plate of a scale device, for example. However, it is inappropriate to have a heavy article placed on the article placing table because placing the heavy article burdens a customer. Therefore, it is inappropriate for such the heavy article to adopt the weight check technology.

Further, a maximum range and a minimum range of a possible accurate weighing are set for a scale device as a weighing performance, but there might be an inaccurate weighing such as a heavy article or a light article beyond the weighing performance of the scale device. Therefore, the weight checks cannot be adopted for the articles beyond the weighing performance of the scale device.

Because of the reasons stated the above, there is an article for which the weight check technique is inappropriate, or the weight check technique cannot be adopted. It might be quite difficult or impossible for these articles to be checked if they are taken outside of a shop by a wrongdoing without an article sales data processing.

SUMMARY OF THE INVENTION

An object of the present invention is to provide an effective measurement for an article taken out of a shop by a wrongdoing.

A self-checkout terminal of the present invention, including an article code reading device for optically reading a code symbol affixed to an article and specifying the article, for decoding an article code, and for outputting the article code, a pickup image part for picking up an image of an area where an article, the code symbol of which is read by the article code reading device, and for outputting a pickup image data, and an alarming device for generating an alarm, wherein (i) an article registration process is executed by searching an article data file, which stores a price corresponding to each article code, for a corresponding price when the article code reading device reads a code symbol, (ii) an extraction process is executed for extracting an exterior characteristic of an article from a pickup image data outputted by the pickup image part, (iii) a consistency is determined between a first data which is obtained based on the extraction process and a second data which is obtained based on an output from the article code reading device and which should be matched to the first data, and (iv) the alarming device generates an alarm when it is determined that there is not a consistency between the first data and the second data.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 7(A) is an exemplary diagram showing an example of an article data file (PLU (Price Look-Up) file);

FIG. 7(B) is an exemplary diagram showing an example of an article data file (weight data file);

FIGS. 10(A)-10(I) show exemplary diagrams of a display transition example when a self-checkout process is executed in the self-checkout terminal;

FIG. 19(A) is an exemplary diagram showing an initial display and a reading confirmation display with respect to a weight check exempted article (a placing place is a placing table); and FIG. 19(B) is an exemplary diagram showing an initial display and a reading confirmation display with respect to a weight check exempted article (a placing place is a floor).

DETAILED DESCRIPTION OF THE PREFERRED EMBODIMENTS

An embodiment of the present invention will be described with reference to FIGS. 1 to 19.

Figure 1:
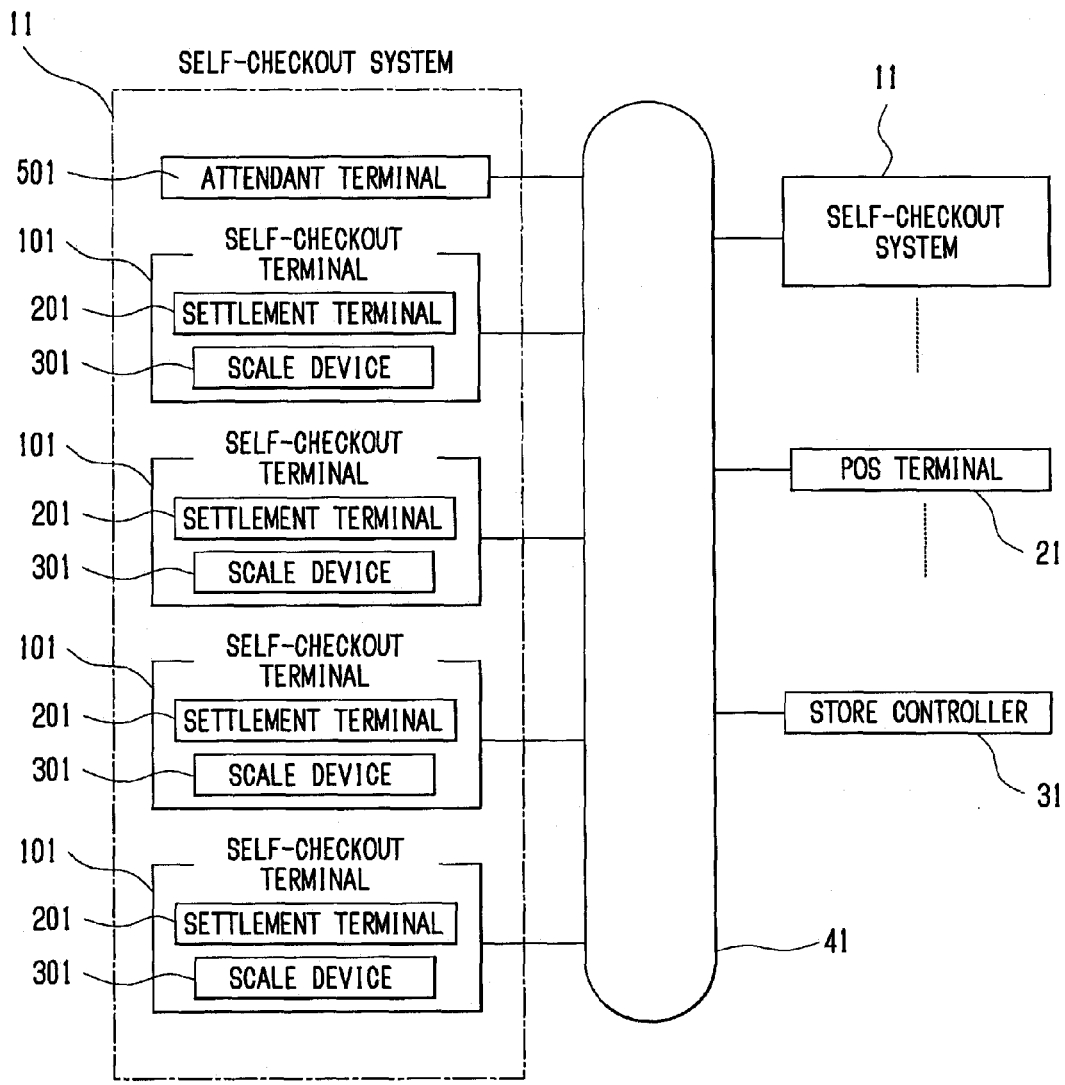
FIG. 1 is an exemplary diagram showing a whole system structure of an embodiment of the present invention.

The embodiment will be explained according to the following items.
1. System Structure
(1) Outline of the System Structure
(2) Self-Checkout Terminal
2. Self-Checkout Process
(1) Basic Routine of the Self-Checkout Process
(2) Display Transition at the Self-Checkout Process
(3) Form Check Process
(4) Weight Check Process
   (i) Details of the Weight Check Process
   (ii) Skip of the Weight Check Process
(5) Article Information Registration Through Display Input
(6) Settlement Hereinafter, an explanation will be executed according to the above items.
1. System Structure
(1) Outline of the System Structure FIG. 1 is an exemplary diagram showing a whole system structure. The system of the embodiment is constituted such that a plurality of self-checkout systems 11, a plurality of POS terminals 21, and a store controller 31 are connected through a communication network 41.

The self-checkout system 11 is constituted that an attendant terminal 501 is assigned to a plurality of self-checkout terminals 101. The self-checkout terminal 101 consists of a settlement terminal 201 and a scale device 301.

Figure 2:
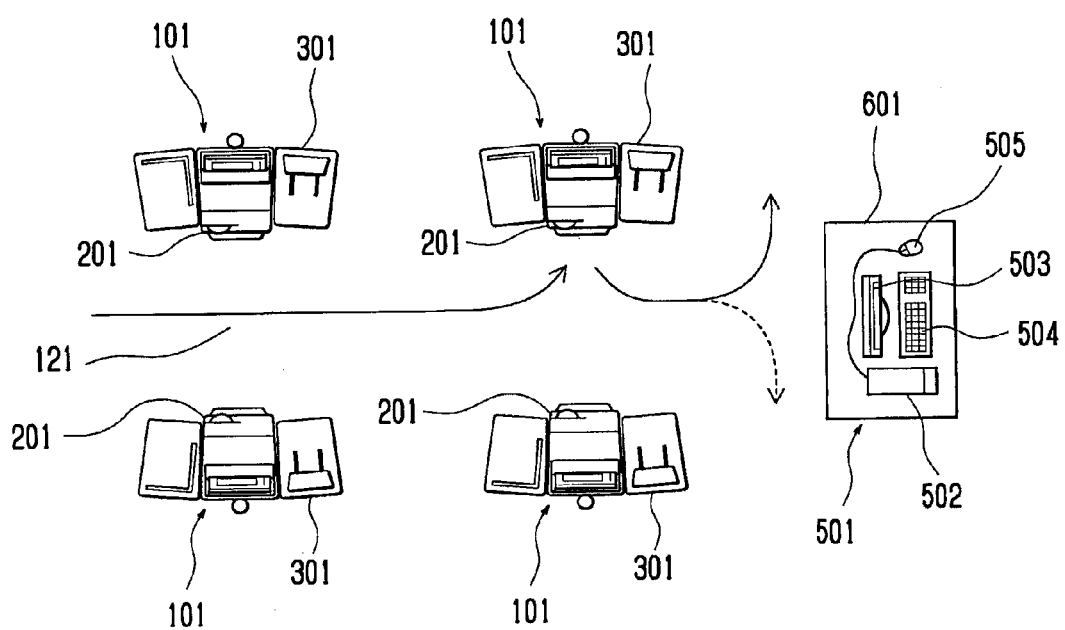
FIG. 2 is a plane view showing a layout of each part of a self-checkout system.

FIG. 2 is a plane view showing a layout of each part of the self-checkout system 11. One attendant terminal 501 is assigned to four self-checkout terminals 101 in the self-checkout system 11 of the present invention. In this self-checkout system 101, a pair of self-checkout terminals 101 is arranged parallel with a customer passage 121, and a front side of each pair of self-checkout terminals 101 faces each other with having the customer passage 121 in-between.

The attendant terminal 501 is arranged at an end of the customer passage 121. The attendant terminal 501 is a form of a personal computer by its appearance, which has a main part 502, a display 503 as a display part, a keyboard 504, and a pointing device 505 as a controller.

A customer is accessible to every self-checkout terminal 101 via the customer passage 121. For instance, when the customer wants to use a self-checkout terminal 101 arranged at a left bottom part of the customer passage from the customer's view, that is, arranged at a right upper part in FIG. 2, the customer passes through the customer passage 121, stands in front of the self-checkout terminal 101, and leave to go round to a left side or a right side of an attendant terminal 601 after he/she completes a self-checkout process.

(2) Self-Checkout Terminal

Figure 3:
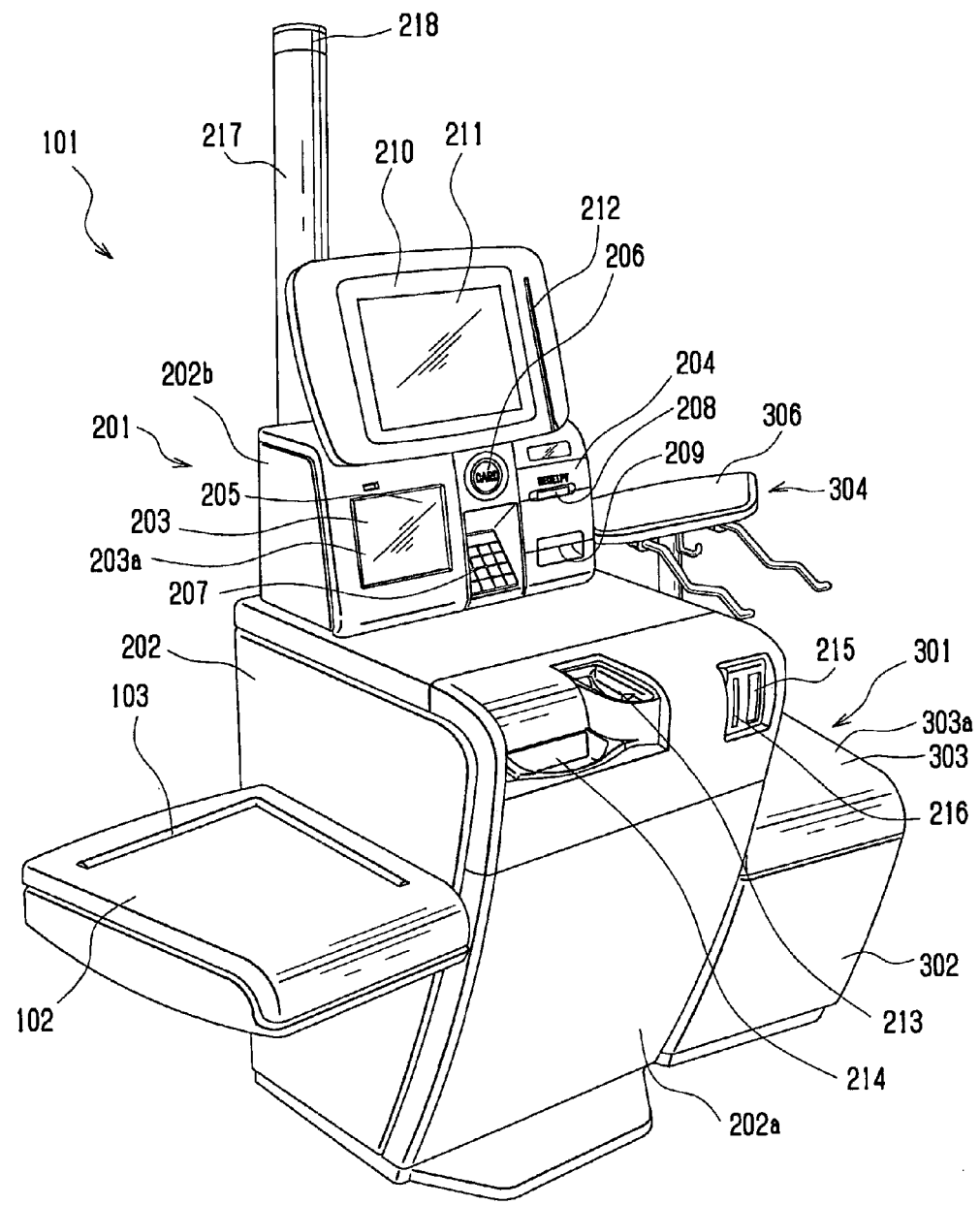
FIG. 3 is a perspective view showing a self-checkout terminal.

FIG. 3 is a perspective view showing the self-checkout terminal 101. The self-checkout terminal 101 consists of the settlement terminal 201 and the scale device 301.

The settlement terminal 201 has a housing 202, at a left side of which an article basket placing table 102 is extended. A protrusion part 103 which decides a position of the basket is formed in L-shape on an upper surface of the article basket placing table 102.

The housing 202 of the settlement terminal 201 constitutes a base housing 202a placed on the floor surface and a smaller upper housing 202b placed on an upper surface of the base housing 202a. A front surface of the base housing 202a inclines backward so that a projected area of the base housing 202a is narrowed as going downward. Thus, the base housing 202a is offsetting backward as going downward.

Various user interfaces are provided at the upper housing 202b. That is, a barcode scanner 203 as an article code reading device at a left side and a printer cover 204 are arranged at the upper housing 202b. A card reader 206 as a settlement part and numeric keys 207 are arranged between the barcode scanner 203 and the printer cover 204.

The barcode scanner 203 has a reading surface 203a formed by an acrylic plate or a glass plate and is an upright scanner functioning as an article reader which emits a predetermined laser pattern on a reading space positioned in front of the reading surface 203a. When an article is positioned in the reading space and a barcode affixed to the article is faced to the reading surface 203a, the barcode scanner 203 receive a reflection light by a receiving element (not shown) from the barcode. Then, the barcode scanner 203 decodes the received signal of the barcode based on an output signal of the receiving element, obtains an article code which the barcode represents as a code data, and outputs to the controller 253 of the settlement terminal 201.

A watch camera 205 is attached behind of the reading surface 203a of the barcode scanner 203. The watch camera 205 has a digital camera structure which consists of a CCD sensor in two dimensional arrangement, a plurality of lens leading a focused image to the CCD, and a control circuit generating and outputting an image data by receiving an output from the CCD (all are not shown). The watch camera 205 is arranged to pick up an image of an area where an article, a code symbol of which is to be read by the barcode scanner 203, is positioned. That is, the watch camera 205 is arranged in a position where an image of the reading space described above can be picked up. Therefore, the watch camera 205 constitutes a pickup image part for outputting a pickup image data by picking up such image.

A receipt issuer 208 is provided to the printer cover 204. A receipt printer 251 (see FIG. 6) is housed in the upper housing 202b at a backside part of the printer cover 204. A receipt (not shown) printed by the receipt printer 251 is issued from the receipt issuer 208. The printer cover 204 is releasably attached with respect to the upper housing 202b, and is released by a pulling operation of a flap 209.

The card reader 206 executes radio communication with a non-contacting IC card (not shown), and reads and writes on the non-contacting IC card. The non-contacting IC card is, for example, able to store electronic money, which has equivalent value to cash. An antenna (not shown) is housed in a backward part of the part where the representation of "card" is shown in the circle shown in FIG. 3, and the antenna performs radio communication with the non-contacting IC card. The numeric keys 207 are used for entering a personal identification number at a settlement with the non-contacting IC card.

A LCD 210 as a display part having a liquid crystal panel is fixed to the upper housing 202b. The LCD 210 has a touch panel 211 as an input part on its displaying surface and a card reading ditch 212 on its right side. A card reader/writer 252 (see FIG. 6) as a settlement part is housed in the card reading ditch 212. The card reader/writer 252 reads information such as a card number and a personal identification number, which stores in a magnetic card such as a credit card and the like.

A receiving/dispensing device 221 (see FIG. 6) for coins and bank notes is housed in the base housing 202a. As a part of the receiving/dispensing device 221, a coin inlet 213 is arranged at a central upper surface of the base housing 202a and a coin dispenser 214 is arranged at a right side of the coin inlet 213. Further, a note inlet 215 and a note dispenser 216 are arranged at a front right upper part of the base housing 202a. This receiving/dispensing device 221 has a mechanism which executes coins and bank notes treatment, and a controller which controls this mechanism (both not shown). Since processes executed by a mechanism and a controller like these are well known, an explanation will be omitted.

A display pole 217 as an alarming device for displaying a current status of the self-checkout terminal 101 is set up from a back surface of the base housing 202a. The display pole 217 has an emission part 218, a tip of which emits blue and red selectively.

Figure 4:
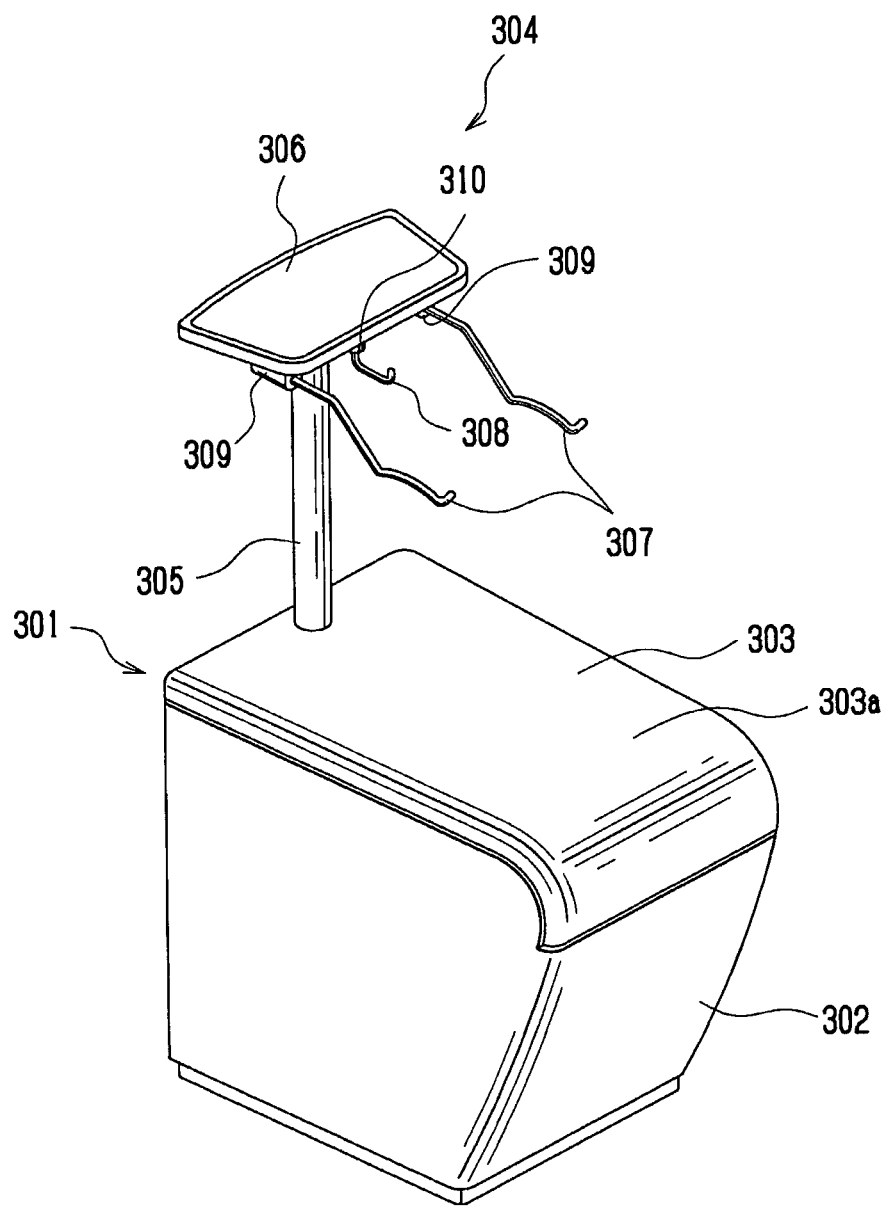
FIG. 4 is a perspective view showing a scale device.

FIG. 4 is a perspective view showing the scale device 301. A scale plate 303 is provided on an upper part of a scale housing 302 and a shopping bag holder 304 is fixed to the scale plate 303 to constitute the scaling device 301. The scale plate 303 has a placing table 303a on its upper surface. The shopping bag holder 304 is fixed to the placing table 303a. Therefore, when seen from the shopping bag holder 304, the scale plate 303 constitutes a base. That is, an arm holder 305 is set up at a back central part of the placing table 303a and a temporary placing table 306 for placing an article is fixed to a top end of the arm holder 305. An upper surface of the temporary placing table 306 is flat to be used for placing an article temporarily after a barcode of the article is read by the barcode scanner 203. Both the placing table 303a and the temporary placing tale 306 play a role as a placing part for placing an article, an article code of which is already read.

A pair of holding arm 307 and a hook 308 are fixed to a back surface of the temporary placing table 306. That is, an arm fixing parts 309 are fixed to both side ends of the back surface of the temporary placing table 306. Fixation of the arm fixing parts 309 is realized by, for example, a screw, a glue, or various fixing methods. And the holding arms 307 are laid in each of the arm fixing parts 309. Also, a hook fixing part 310 is fixed at a central part of the back surface of the temporary placing table 306. Fixation of the hook fixing part 310 is realized by, for example, a screw, a glue, or various fixing methods. And the hook 308 is laid in the hook fixing part 310.

Figure 5:
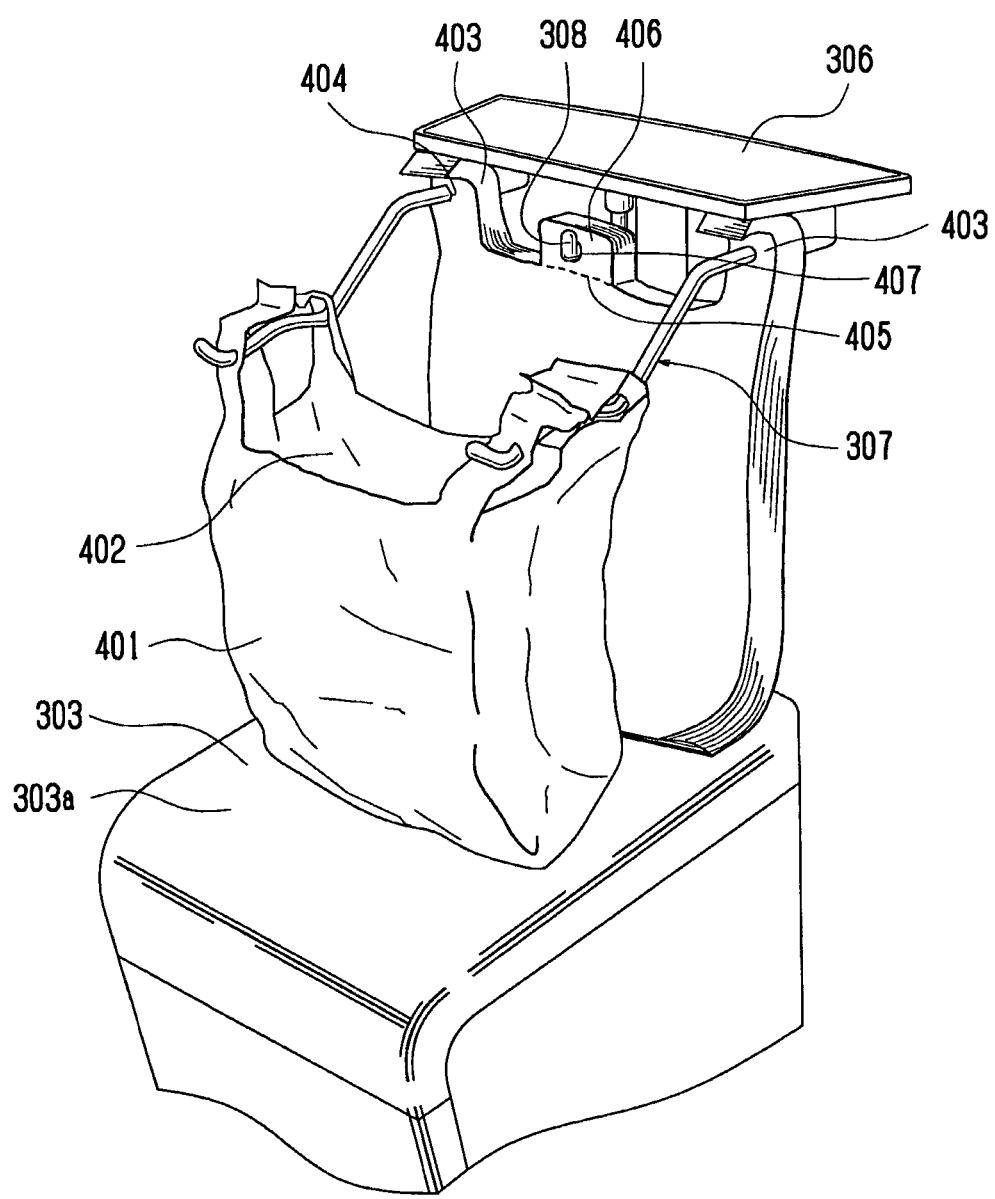
FIG. 5 is a perspective view showing a status in which a shopping bag is held to a holding arm.

FIG. 5 is a perspective view showing a status that a shopping bag 401 as a storing bag is held to the holding arms 307. The shopping bag 401 has an opening 402 and a pair of handle 403, which is folded at both side of the shopping bag 401. The holding arms 307 pierceably holds the pair of handle 403 of the shopping bag 401 such as a plastic bag and so on, which is provided to a customer in a supermarket. Further, a pair of ear 406 is formed detachably at a perforation 405 between the pair of handle 403, and holes 407 are formed in these ears 406. The hook 308 is pierced through the holes 407 so as to hold the shopping bag 401 with the holding arms 307.

Figure 6:
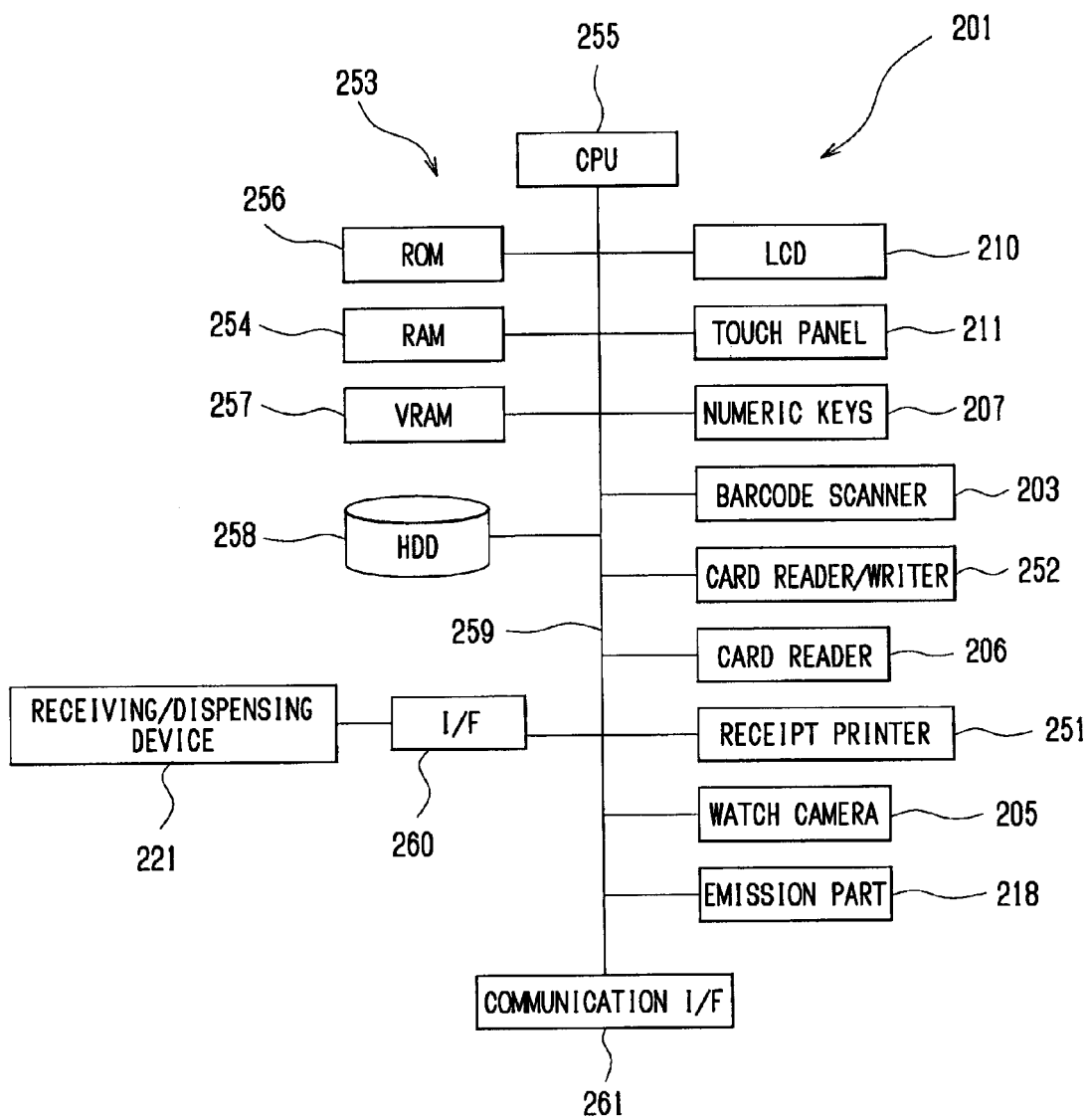
FIG. 6 is a block diagram showing an electrical hardware structure of a settlement terminal.

FIG. 6 is a block diagram showing an electric hardware structure of the settlement terminal 201. The settlement terminal 201 has a controller 235 as an information processor in its inside. The controller 235 can be, for example, either a semi-conductor chip structure in which a operation sequence is written, or a microcomputer structure operated by storing an operation program stored in a RAM 254 and so on. Here, a controller 235 of the microcomputer structure will be described.

A core part of the controller 253 is a CPU (Central Processing Unit) 255. In the CPU 255, a ROM (Read Only Memory) 256 for fixably storing fixed data, a RAM 254 (Random Access Memory) for rewritably storing changeable data, VRAM (Video RAM) 257 for generating a display image displaying at a LCD (Liquid Crystal Display) 210, and HDD (Hard Disk Drive) 258 are connected via a system bus 259. As an example, the HDD 258 stores an operation program, a various display frame, a PLU (Price Look-Up) file PF (see FIG. 7 (A)), a category file, a weight data file WDF (see FIG. 7(B)), an image file, a sales file, and so on (not shown except the PLU file PF and the weight data file WDF), and these operation programs, the various display frames, and various rule information and so on are transferred to the RAM 254 at an initial operation for use. The various files such that the PLU file PF (see FIG. 7 (A)), the category file, the weight data file WDF (see FIG. 7(B)), the image file, a sales file, and so on constitute an article data file.

The PLU file PF, which constitutes the article data file, rewritably stores an article display, whether a discount article or not, a discount price, M&M (Mix and Match) information and a price corresponding to an article code which specifies each article. The article display includes text data of a name of the article and the article's image data specified by the article code.

The category file, which constitutes the article data file, rewritably stores a price, an article display, whether a discount article or not, a discount price, M&M (Mix and Match) information and so on corresponding to a category code of each article. The category code is not stored in the PLU file PF. The article display includes text data of a name of the article and the article's image data specified by the category data.

FIG. 7(A) is an exemplary diagram showing an example of the PLU file PF which constitutes the article data file. The PLU file PF stores an article display, a price and an image data corresponding to an article code. The article display is a text data, which is equivalent to the corresponding article's name. The image data is an image data of the corresponding article. The PLU file PF may include the category file as another example.

FIG. 7(B) is an exemplary diagram showing an example of the weight data file WDF, which constitutes the article data file. The weight data file stores a predetermined weight (g), a definition of whether a weight check is executed or not, an article placing location definition (skip bagging), a permissible type definition, an upper limit permissible value, a lower limit permissible value, and a weight update flag. The weight data file WDF may include the PLU file PF, and the section file as another example.

The predetermined weight (g) stores a predetermined value of a weight of an article specified by the article code.

The definition of whether a weight check is executed or not is, as described above, definition information which stores whether the weight check is executed or not corresponding to each article code. The controller 253 of the self-checkout terminal 101 interprets [0] as "Do not weight check", and [1] as "Do weight check" during the definition of whether the weight check is executed or not. As an example of the article, the weight of which is not checked, is an article which is too light or is not appropriate for weighing, or the article which is too heavy and therefore hard to transfer to the placing table 303a of the scale device 301. The definition of whether the weight check is executed or not may be included to the PLU file PF as another example.

The article placing location definition (bagging skip) defines which placing location should be for an article, a barcode of which has been read by the barcode scanner 203. The placing location is the placing table 303a (no weight skip), a temporary placing table 306 (weight skip (weighing)), or a floor (weight skip (weight)). The controller 253 of the self-checkout terminal 101 interprets [0] as the placing table 303a (no weight skip), [1] as the temporary placing table 306 (weight skip (weighing)), and [2] as the floor (weight skip (weight)) during the definition of whether the weight check is executed or not. As another example, the article placing location definition may be included to the PLU file PF. Further, as another example, characteristic information of the article such as easily cracked, easily broken, easily got out of shape, or heavy is stored in the PLU file PF and the article placing location definition defines the temporary placing table 306 to be the placing location for the article which is easily cracked, easily broken, or easily got out of shape, and defines the floor to be the placing location for the heavy article. Further, as another example, as the placing location for the read article when the weight is heavier than the predetermined weight stored in the weight data file WDF, the floor is defined.

The permissible value type definition is information which defines whether a permissible range with respect to the predetermined weight (g) should be either a rate, or the upper limit value and the lower limit value. That is, at a weight check process, a comparison process of the weights between a real weight weighed by the scale device 301 and the weight stored in the predetermined weight (g) is executed. At that moment, a permissible range with respect to the predetermined weight (g) is defined. The permissible range is obtained from the rate with respect to the weight value stored in the predetermined weight (g) according to the definition stored in the permissible value type definition, or is obtained from the predetermined upper limit value and lower limit value.

The upper limit permissible value and the lower limit permissible value store value information for defining the permissible range with respect to the predetermined weight (g). When the permissible value type definition takes the rate with respect to the weight value stored in the predetermined weight (g) as the permissible range, a value to be stored in the upper limit value and the lower limit value will be a percentage order values. Also, when the permissible value type definition takes a specific value as the upper limit value and the lower limit value with respect to the weight value stored in the predetermined weight (g), a value to be stored in the upper limit value and the lower limit value will be the specific value itself.

The weight update flag stores whether a weight registration process is executed or not. The controller 253 of the self-checkout terminal 101 interprets [0] as "not updated yet", [1] as "automatically updated", [2] as "manually updated", and [3] as "individually updated". When not yet updated, a default value is selected. The automatic update is executed through the weight registration process. The manual update is executed by a hand input. The individual update is executed by a hand input after the automatic update.

Now, going back to the explanation of the block diagram showing an electrical hardware structure of the settlement terminal 201 shown in FIG. 6. The barcode scanner 203, the LCD 210, the touch panel 211, the card reader 206, the numeric keys 207, the card reader/writer 252, the receipt printer 251, the watch camera 205, the emission part 218 constituting the alarming device, an interface 260 which executes data communication with the receiving/dispensing device 221 are connected to the controller 253 via the system bus 259 so as to be controlled by the controller 253. The controller 253 controls each part and executes an article sales data process which includes a search process, a form check process, the weight check process, an article information registration process and a settlement process.

The search process recognizes an article code specified by a barcode when the barcode affixed to the article is read by the barcode scanner 203, and searches the PLU file PF and the weight data file WDF and acquires a price, a weight and an article display corresponding to the article code.

The form check process is a process for determining whether an article is treated as a purchased article by mistake or a wrongdoing even if a barcode affixed to the article has not been read correctly after the article passed through the reading space, a frontal surface of the reading surface 203a of the barcode scanner 203, based on a pickup image by the watch camera 205 for picking up an image of the reading space. That is, in the form check process, the controller 253 executes an extraction process for extracting an exterior characteristic of the article from a pickup image data outputted by the watch camera 205, and obtains a first data based on the extraction process. The controller 253 obtains a second data to be matched with the first data based on an output of the barcode scanner 203. Then, the controller 253 determines there is a consistency between the first data and the second data if there is a consistency between the two pieces of data, whilst the controller 253 determines there is not a consistency between them if there is not a consistency. Since the first data and the second data should be matched, if there is not a consistency, it is presumed that following circumstances may happen.

(The First Circumstance)

An article, a barcode of which was read by the barcode scanner 203 does not match the article picked up by the watch camera 205 with respect to the exterior image.

(The Second Circumstance)

The number of an article, a barcode of which was read by the barcode scanner 203 do not match the number of the article picked up an image by the watch camera 205.

(The Third Circumstance)

Although the watch camera 205 picks up an image of an article, the barcode scanner 203 does not read a barcode of the article.

These circumstances happens when an article, an image of which was picked up by the watch camera 205, is treated as a purchased article by a wrong operation or a wrongdoing even if a barcode affixed to the article has not been read. Thus, when the controller 253 determines there is a consistency between the first data and the second data, the controller 253 recognizes the barcode affixed to the article, an image of which was picked up by the watch camera 205, has been read correctly, whilst when the controller 253 determines there is not a consistency between the first data and the second data, the controller 253 recognizes the barcode affixed to the article, an image of which was picked up has not been read correctly.

The weight check process is a process determining whether the weight of the article, which is weighed by the scale device 301 after the barcode was read, is identical to the weight acquired by the search process. Whether the weight is identical or not is determined by seeing whether the weight of the article, which was obtained based on the weighed weight by the scale device 301, is within a permissible range of the weight (a range between the upper limit value and the lower limit value, for example) acquired by the search process, that is, within a weight range.

The article information registration process executes a temporal registration of transaction information to the RAM 254, which includes the article code specified by the barcode and the price searched by the search process based on the specified article code when the barcode affixed to the article is read by the barcode scanner 203.

The settlement process is a process to calculate a settlement amount based on the price acquired through the search process, and to execute a settlement of the settlement amount. The settlement amount is obtained by calculating necessary sales amount which includes a consumer tax in accordance with a closing operation through the touch panel 211, and is registered temporarily to the RAM 254, or is registered to a sales file. The settlement process enables the calculated settlement amount to be settled by cash, a magnetic card such as a credit card, electronic money or a non-contacting IC card, which stores an identification number identifying a bank account. A cash treatment is executed at the receiving/dispensing device 221 provided at the base housing 202a, while a magnetic card treatment is executed through the card reading/writing part 206.

In the embodiment of the present invention, a concept of an article sales data processing is used in a broad sense which includes the search process, the form check process, the weight check process, the article information registration process, the settlement process and so on. Therefore, to assist the article sales data processing which includes the broad sense of meaning, the controller 253 of the settlement terminal 201 provides a customer with a display of operation method for their convenience.

The communication interface 261 is connected via the system bus 259 to the controller 253. The controller 253 is connected to the communication network 41 so as to realize data communication between the attendant terminal 510, the store controller 31, and the self-checkout terminal 101.

Figure 8:
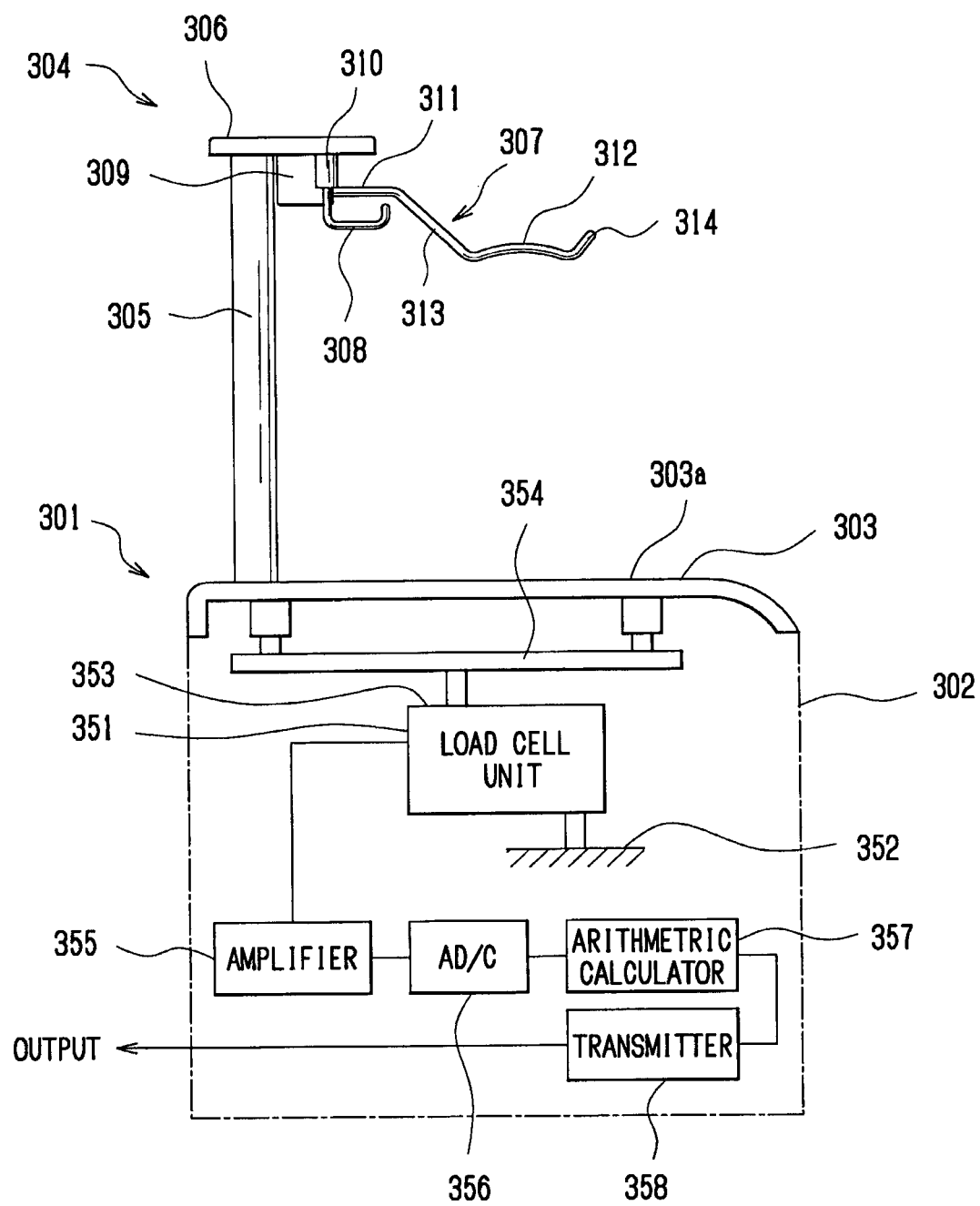
FIG. 8 is an exemplary diagram showing an electrical hardware structure of the scale device.

FIG. 8 is an exemplary diagram showing an electrical hardware structure of the scale device 301. The scale device 301 has a load cell unit 351. One end of the load cell (a structure and a shape is not shown) is fixed to a base 352, and a load receiving part 353 is provided at the other end. A scale frame 354 is formed in X-shape when seen from plane view, and places scale plates 303 at its four corners. An output signal of the load cell unit 351 is amplified at an amplifier 355 and converted into a digital signal at an analogue/digital converter (AD/C) 356, and analyzed at an arithmetic calculator 357. At the arithmetic calculator 357, a weight analysis is performed based on the output signal of the load cell unit 351. The arithmetic calculator 357 may be a semi-conductor chip structure in which an operation sequence is written, or a microcomputer structure, which operates by operation programs stored in a RAM or the like. The arithmetic calculator 357 transmits weight data to the transmitter 358, which is a result of the analysis, and outputs it to the settlement terminal 201 through the transmitter 358. The transmission of the weight data to the settlement terminal 201 is executed periodically at a predetermined cycle for one example, and for another example, the transmission is executed periodically at a predetermined cycle after a user assigns a start of a self-checkout process. It is desirable that the cycle of the examples is short such as few microseconds to few hundred microseconds.

In the embodiment as explained above, the self-checkout terminal 101 enables a self-checkout. At this point, the controller 253 of the settlement terminal 201 and the arithmetic calculator 357 of the scale device 301 executes various arithmetic calculation processes, a drive control process and so on, so as to assist the self-checkout process. That is to say, the settlement terminal 201 displays various user assistance displays and executes the search process, the weight check process, and the article sales data process as described above. The scale device 301 transmits and outputs the weighed value from the transmitter 358 to the settlement terminal 201 in order to assist the weight check process at the settlement terminal 201. In the following, a flow of the self-checkout process will be explained with reference to a flowchart showing a flow of the processes, various display examples and display transition examples, and so on.

2. Self-Checkout Process (1) Basic Routine of the Self-Checkout Process

Figure 9:
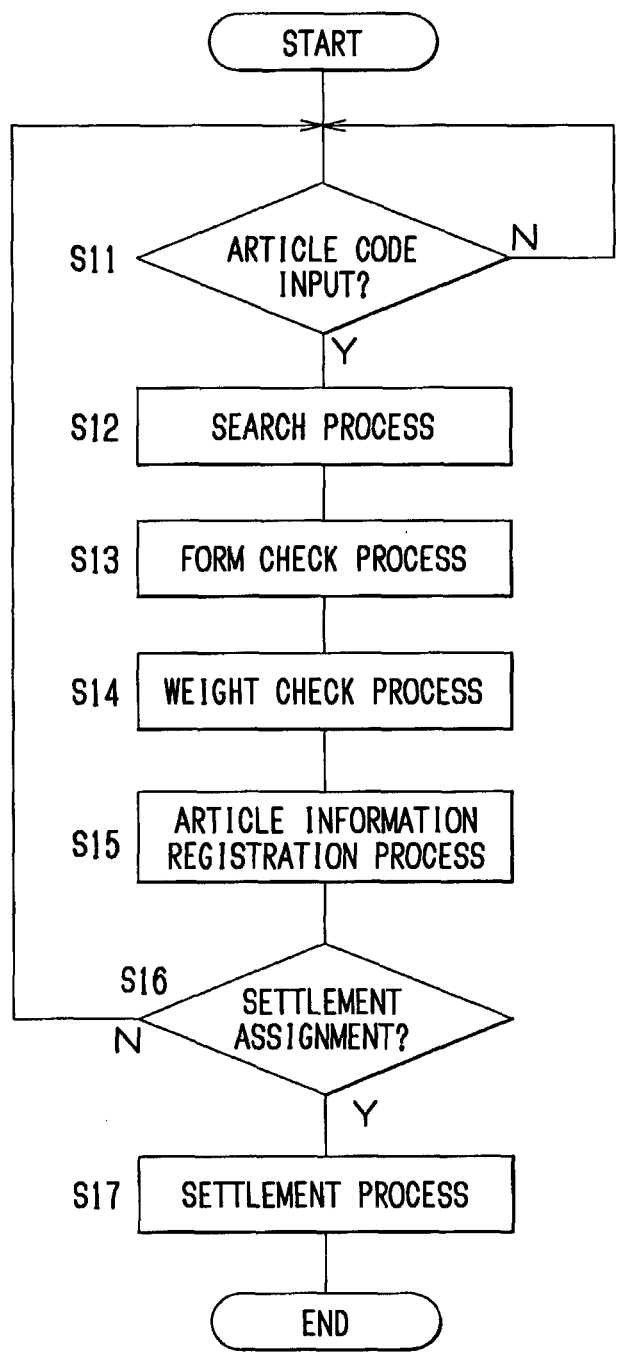
FIG. 9 is a flow chart showing a flow of a self-checkout process in the self-checkout terminal.

FIG. 9 is a flowchart showing a flow of the self-checkout process at the self-checkout terminal 101. The controller 253 of the self-checkout terminal 101 stands by for a decision whether the article code is input or not (step S11). An input of the article code is performed by the barcode scanner 203, or an input operation is done through the touch panel 211 in accordance with a display of the LCD 210.

When the controller 253 of the self-checkout terminal 101 determines there is an input of the article code (Y of step S11), the search process is executed (step S12). As a result, as explained above, the price, the weight and the article display correspondent to the code input article is acquired.

Followed by the search process, the controller 253 of the self-checkout terminal 101 executes the form check process (step S13), and then executes the weight check process (step S14). The form check process will be explained with reference to FIGS. 12 to 17 later.

Followed by the weight check process and the form process, the controller 253 of the self-checkout terminal 101 executes the article information registration process (step S15). That is, when the weight check process and the form check process are gone through, transaction information such as the article code, the price and so on is temporarily registered to the RAM 254.

Followed by the article information registration process, the controller 253 of the self-checkout terminal 101 determines whether a settlement is assigned or not (step S16). The settlement assignment is executed by an input operation through the touch panel 211 in accordance with the display of the LCD 210. Then, if the controller 253 of the self-checkout terminal 101 determines there is a settlement assignment (Y of step S16), the controller 253 executes the settlement process as described above (step S17).

(2) Display Transition at the Self-Checkout Process

Figure 10A:
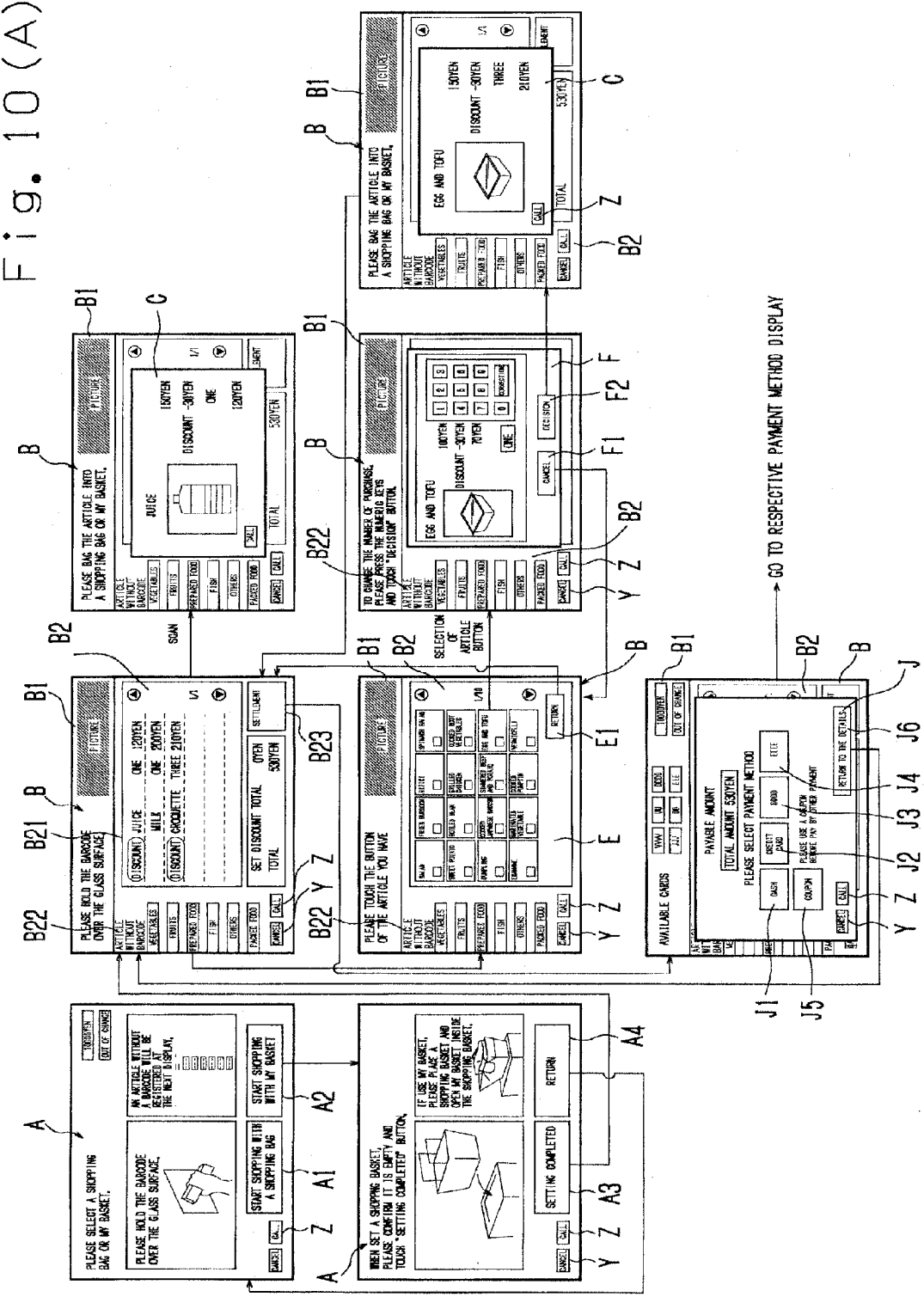

FIGS. 10(A)-10(I) show exemplary diagrams of a display transition example in the self-checkout process of the self-checkout terminal 101. In particular, FIG. 10(A) shows exemplary diagrams of the overall display transition example, and each of the exemplary diagrams of FIG. 10(A) is more clearly illustrated in diagrams of FIGS. 10(B)-10(I). According to the self-checkout process, a customer brings a basket, including an article to be purchased, to the self-checkout terminal 101, and puts the basket on the article placing table 102 of the self-checkout terminal 101.

At this point, the controller 253 of the self-checkout terminal 101 generates an initial guidance display A as shown in FIG. 10(B) and displays it on the LCD 210. The initial guidance display A guides the customer how to treat the article. Treatment methods guided here are two. One is an article code input by using the barcode scanner 203, and the other is an input assignment through the touch panel 211. As for guidance for the former method, an explanation that "Please hold the barcode over the glass surface" is guided with a picture depicting the explained status. As for guidance for the latter method, an explanation that "An article without a barcode will be registered at the next display" is guided with a picture depicting the next display.

At this point, the controller 253 outputs information indicating its stand-by status as an operation status information showing whether it is in stand-by status or in scanning operation status, to the assigned attendant terminal 501.

The initial guidance display A enables a selection of either using a shopping bag or my basket by providing two selection buttons A1 and A2. Here, my basket means that the basket is owned by a customer. When the selection button A1 is touched and assigned, a self-checkout process with a shopping bag 401 is started. Whilst, the selection button A2 is touched and assigned through the touch panel 211, a self-checkout process with my basket is started.

At this point, the controller 253 outputs information indicating its operation status as an operation status information showing whether it is in stand-by status or in scanning operation status, to the assigned attendant terminal 501.

FIG. 10(C) shows an example of starting the self-checkout process with my basket when the selection button A2 is touched and assigned through the touch panel 211. The difference between the process of the shopping bag 401 and the process of my basket is a zero point setting. When the process of my basket is executed, the controller 253 generates and displays an image for guiding a customer that a shop's basket should be placed on the placing table 303a of the scale device 301 and my basket is opened inside the shop's basket. And, a setting completion button A3 and a back button A4 are displayed in the initial guidance display A after my basket was selected as shown in FIG. 10(c). When the setting completion button A3 is touched and assigned through the touch panel 211, the controller 253 communicates the scale device 301 that the zero point setting needs to be executed. When the back button A4 is touched and assigned through the touch panel 211, the display goes back to the initial guidance display A as shown in FIG. 10(B).

A cancellation button Y and a calling button Z are displayed at a lower left part of the initial guidance display A in FIG. 10(C). The cancellation button Y is a button for canceling a process, and the calling button Z is a button for calling a shop assistant (an attendant). The controller 253 generates and displays the cancellation button Y and the calling button Z properly on each display which transits according to a series of flow of the self-checkout process.

In FIG. 10(C), when the setting completion button A3 is touched and assigned through the touch panel 211 at the initial guidance display or after the selection button A1 was selected and assigned through the touch panel 211 in FIG. 10(B), the controller 253 generates a basic display B and displays it on the LCD 210 as shown in FIG. 10(D). The basic display B constitutes a guidance display area B1 and a user area B2. The guidance display area B1 is arranged at an upper position, and the user area B2 is arranged at a lower position.

The guidance display area B1 displays various guidance which is necessary for a self-checkout. The user area B2 displays various operation buttons and transaction information which is necessary for a self-checkout.

An explanation that "Please hold the barcode of the article over the glass surface" with a picture depicting the explained status on the guidance display area B1 at the first basic display B is displayed as shown in FIG. 10(D), and the display B stands by for reading the barcode of the article.

An article assignment button B22 for assigning an article without a barcode is displayed as one of various operation buttons at the user area B2 in the first basic display B which is in FIG. 10(D) and which stands by for reading of the barcode affixed to the article, and transaction information B21 including a name of the article to be purchased, a quantity, a price, and a total amount of the articles to be purchased are displayed. The display example of FIG. 10(D) shows a status in which a bottle of juice, a pack of milk, and three croquettes have been already registered. When the number of purchasing article increases, a scrolling display is available by touching and assigning a scrolling button through the touch panel 211 in the transaction information B21. Also, there are circle marks displayed at sides of the juice and the croquettes. These circles show these articles are discounted. To show whether an article is discounted or not is possible to let the PLU file PF to have discount information.

The customer holds the article in front of the barcode scanner 203 so that the barcode is read according to the guidance display which is displayed in the guidance display area B1 of the first basic display B in FIG. 10(D).

Figure 10E:
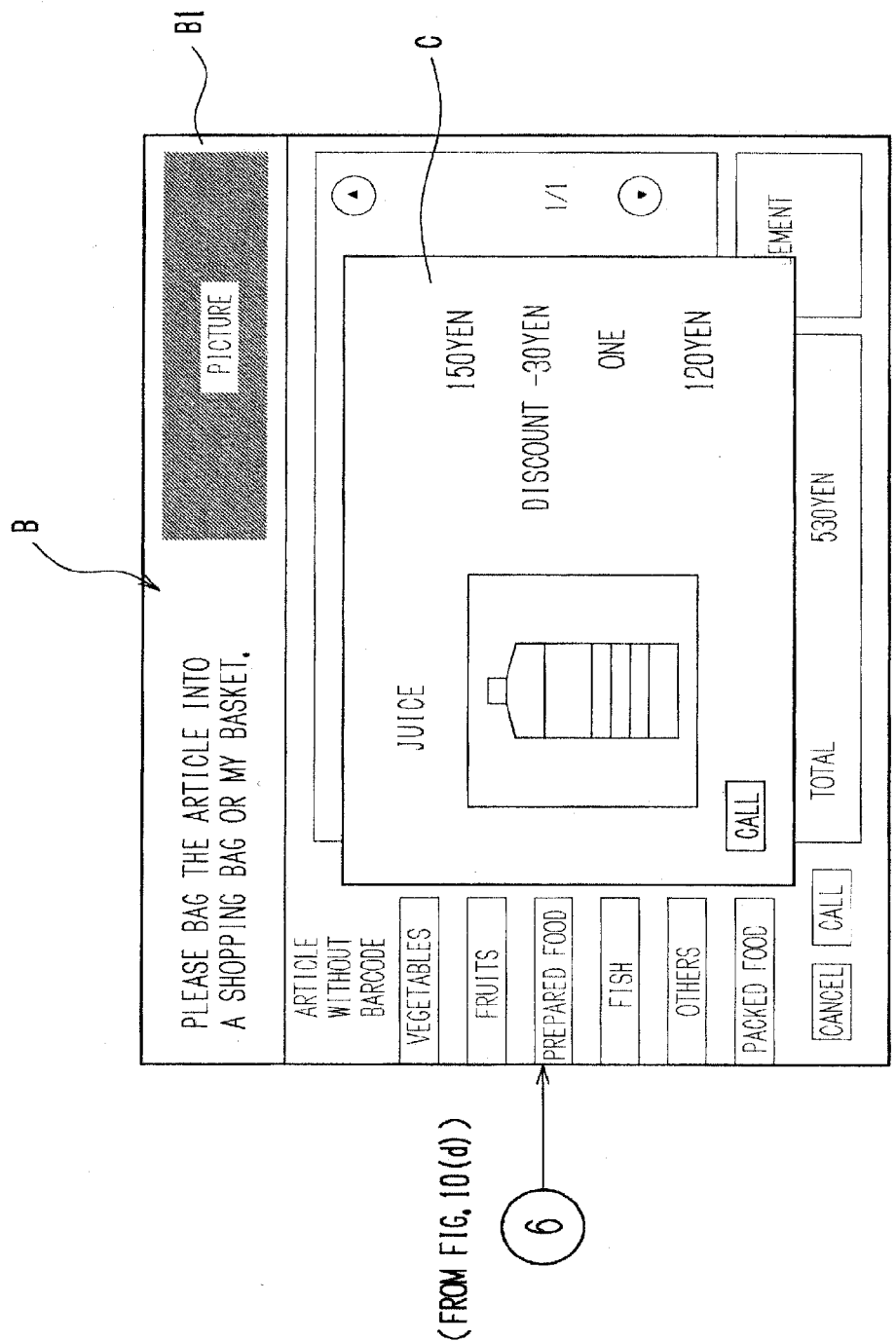

At this point, the controller 253 reduces brightness of the user area B2 of the basic display B displayed on the LCD 210, generates a reading confirmation display C, and displays the generated reading confirmation display C to lap over the user area B2 as shown in FIG. 10(E). The reading confirmation display C includes the transaction information such as a price, a discount price, a quantity of articles, and a total amount of the article, the barcode of which has been read and searched from the PLU file PF. Also, the reading confirmation display C includes letters based on text data of a name of the article cited from the article display stored in the PLU file PF, and a picture based on the image data of the article. The reading confirmation display C may adopt a common pop up display technique for a display, and also may adopt a technique using a display frame to display the reading confirmation display C to lap over the basic display B. That is to say, it is enough for the reading confirmation display C to be displayed lapping over the basic display B. Therefore, there is no limitation for the display technique to be adopted.

Significantly, the reading confirmation display C laps over the user area B2 of the basic display B only, and does not lap over the guidance display area B1. Therefore, the guidance display can be displayed on the guidance display area B1 continuously. When the barcode affixed to the article is read by the barcode scanner 203, at the example shown in FIG. 10(D), the display is transited from the first basic display B including the display of "Please hold the barcode of the article over the glass surface" to the display of "Bag the article into a shopping bag or my basket" at the guidance display area B1 as in FIG. 10(E). The controller 253 transits not only the explanation, but also the picture for assisting the work to bag the article into a shopping bag or my basket. Since the reading confirmation display C does not lap over the guidance display area B1, the customer can confirm the guidance display and the display transition on the guidance display area B1 easily.

Figure 11:
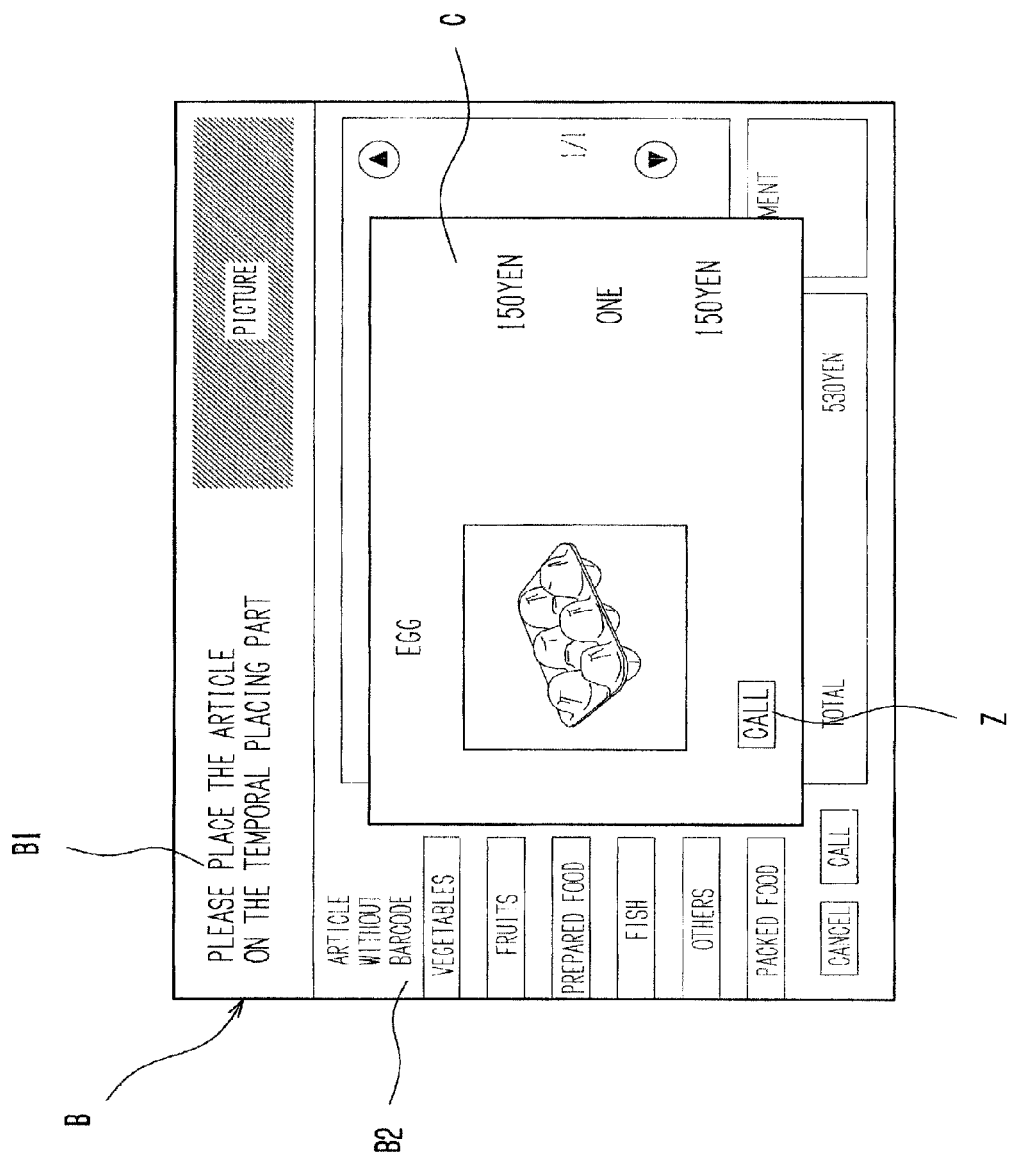
FIG. 11 is an exemplary diagram showing an initial display and a reading confirmation display with respect to an article to be placed on a temporal placing table.

FIG. 11 is an exemplary diagram showing the basic display B and the reading confirmation display C with respect to the article to be placed on the temporary placing table 306. As described above, the settlement terminal 201 has the article placing location definition. Thus, when the barcode of the article is read by the barcode scanner 203, and the temporary placing table 306 is defined as the article placing location definition at the first basic display B (FIG. 10(D)), the controller 253 generates and displays the explanation that "Place the article on the temporary placing table." with a picture for assisting the explanation in the guidance display area B1 on the LCD 210.

Now, going back to the explanation with reference to FIG. 10(D), the controller 253 executes the form check process after a barcode affixed to an article is read by the barcode scanner 203. Details of the form check process will be explained with reference to FIGS. 12 to 17. When the controller 253 recognizes the article, an image of which is picked up by the watch camera 205, is treated as a purchased article by a wrong operation or a wrongdoing even if the barcode affixed to the article has not been read correctly, the controller 253 stops a progress of an article sales data processing and executes a process for alarming announcement. That is, the controller 253 changes an emission color of the emission part 218 provided at the tip of the display pole 217 from blue to red so as to announce to a shop assistant (an attendant, for example) that there has been a wrong operation or a wrongdoing. As a result of stop of the progress of the article sales data processing, a display of the LCD 210 remains as the reading confirmation display C is displayed and shows the customer that the process is not in progress.

After executing the form check process, the controller 253 stands by for the weight check process after the barcode affixed to the article is read by the barcode scanner 203. Therefore, a guidance of the explanation that "Bag the article into a shopping bag or my basket" with the picture for assisting the explanation is displayed as shown in FIG. 10(E). Alternatively, as shown in FIG. 11, when the temporary placing table 306 is defined as the article placing location definition, the guidance of the explanation that "Place the article on the temporary placing table" with the picture for assisting the explanation is displayed on the guidance display area B1. Then, the customer bags the article, the barcode of which has been read by the barcode scanner 203, into the shopping bag 401 or my basket, or places the article on the temporary placing table 306 according to the guidance. Consequently, the article, which was bagged in the shopping bag 401 or was placed on the temporary placing table 306, loads onto the scale plate 303 of the scale device 301, thereby the load is weighed by the load cell unit 351. The weighed result by the load cell unit 351 is output to the settlement terminal 201 through the transmitter 358 as described above. The settlement terminal 201 receives the weighed result by the load cell unit 351 and executes the weight check process. As described above, the weight check process is a process to see whether the weight of the article, the barcode of which was read, and which was weighed by the scale device 301, has identity to the weight acquired from the weight data file WDF by the search process. To see whether both have identity or not, it is determined that the weight obtained based on the weighed weight by the scale device 301 is within the weight permission range (the range between the upper limit value and the lower limit value, for example) acquired by the search process, that is, within the weight range.

When it is determined that both weights do not have identity as a result of the weight check process, there would have been a wrong operation or a wrongdoing. Thus, in this case, the controller 253 stops the progress of the article sales data processing and changes the emission light of the emission part 218 provided at the tip of the display pole 217 from blue to red so as to announce to the shop assistant (the attendant) that there was an operation error or a wrongdoing. As a result of stop of the article sales data processing, the display image of the LCD 210 remains in the reading confirmation display C so as to inform the customer that the process does not proceed.

(3) Form Check Process

Here, details of the form check process will be explained with reference to FIGS. 12 to 17. The self-checkout terminal 101 executes three kinds of form check process. These three kinds of form check process share the following processes: an extraction process for extracting an exterior characteristic from an pickup image data outputted from the watch camera 205, a process for determining a consistency between the first data acquired based on the extraction process and the second data to be matched with the first data based on an output from the barcode scanner 203, and an alarming process for stopping a progress of an article sales data process and changing an emission color of the emission part 218 provided at the tip of the display pole 217 from blue to red when it is determined that there is not a consistency. Here, the three kinds of form check process execute different process regarding the consistency determination process between the first data and the second data. Each different determination process is called as a first determination process, a second determination process, and a third determination process for convenience. These different determination processes are applied to different kinds circumstances which cause lack of a consistency between the first data and the second data. As described above, the three kinds of different circumstances are as follows.

(The First Circumstance)

An article, a barcode of which was read by the barcode scanner 203 does not match the article picked up by the watch camera 205 with respect to the exterior image.

(The Second Circumstance)

The number of an article, a barcode of which was read by the barcode scanner 203, do not match the number of the article, an image of which is picked up by the watch camera 205.

(The Third Circumstance)

Although the watch camera 205 picks up an image of an article, the barcode scanner 203 does not read a barcode of the article.

The first circumstance may happen when a barcode label of a relatively cheap article is removed and then affixed to a relatively expensive article and the relatively expensive article is scanned by the barcode scanner 203. The second circumstance may happen when more than two articles are scanned at the same time. Especially, this circumstance may happen when the relatively cheap article and the relatively expensive article are held in both hands respectively and only a barcode of the relatively cheap article is faced to the reading surface 203a of the barcode scanner 203 and a scanning operation is executed. The third circumstance may happen when a barcode affixed to an article is not faced to the reading surface 203a of the barcode scanner 203 and a scanning operation is executed. Although all these circumstances happen by the wrongdoings, it is difficult to recognize the wrongdoings from a shop assistant who is positioned at the attendant terminal 501. The form check process enables a detection of the wrongdoings easy. Especially, the first determination process included in the form check process determines a lack of consistency in the first circumstance described the above, the second determination process determines a lack of consistency in the second circumstance described above, and the third determination process determines a lack of consistency in the third circumstance described above. Detailed processes of the three kinds of form check process will be explained as follows.

First of all, the first determination process including the form check process will be explained. The first determination process is executed by a process for obtaining an exterior characteristic of an article as a first data extracted by the extraction process for extracting the exterior characteristic of the article from an pickup image data outputted by the watch camera 205, a process for obtaining corresponding characteristic data as a second data from an article characteristic database (not shown) based on an article code outputted by the barcode scanner 203, and a process for determining there is a consistency when the obtained first data and the obtained second data have a consistency, whilst determining there is not a consistency when the obtained first data and the obtained second data do not have a consistency.

For the first determination process, the store controller 31 (see FIG. 1) provides the article characteristic database described above. The article characteristic database stores an article code which corresponds to exterior characteristic data. The characteristic data specifies a distinctive color, a shape, a pattern, a letter and so on of an article. To be specific, the characteristic data that a distinctive color, a shape, a pattern, a letter and so on of an article are evaluated as characteristic values. The characteristic data can be produced in advance with data provided by a producer, data provided by a dealer of an article, or by picking up an image of an article.

Figure 12:
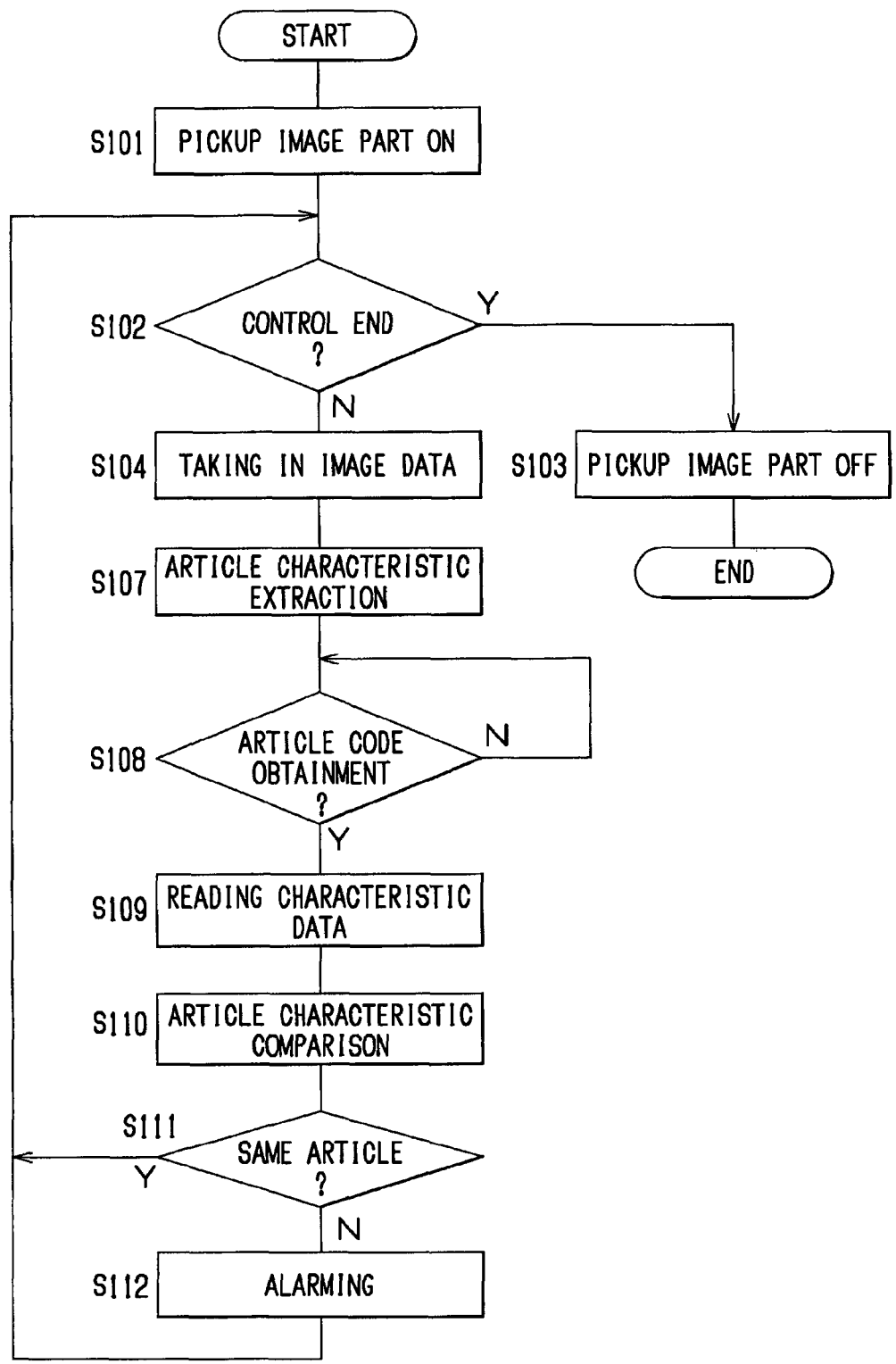
FIG. 12 is a flowchart showing a flow of a form check process including a first determination process.

FIG. 12 is a flowchart showing a flow of the form check process including the first determination process. The controller 253 outputs ON signal to the watch camera 205 when either the selection buttons A1 or A2 (see FIG. 10(B)) is touched and assigned, and a self-checkout process is started (step S101). Thereby, a pickup operation of image by the watch camera 205 is initialized. The pickup image operation continues until a termination command is determined (step S102). The controller 253 generates the termination command when the settlement button B23 displaying [Settlement] in the user area B2 in the first initial display B shown in FIG. 10(D) is touched and assigned. The touching assignment of the settlement button B23 means a closing assignment. This will be explained later. The controller 253 outputs an OFF signal to the watch camera 205 (step S103) according to the termination command (Y of step S102). Thereby, the pickup operation of the image by the watch camera 205 is over.

The controller 253 takes the pickup image data outputted by the watch camera 205 into the RAM 254 (step S104). Then, the controller 253 extracts a characteristic of an article as characteristic data from the pickup image data taken into the RAM 254 (step S107). The characteristic of the article to be extracted is data that a silhouette of an article, a color of the package, a pattern, a letter, a trademark and so on are evaluated as characteristic values, for example. The processes are executed by applying a well-known image processing technology. The extracted characteristic data of an article constitutes the first data.

Followed by the extraction process of the characteristic data (step S107), the controller 253 executes a process for determining whether an article code is obtained or not, that is, stands by for a determination of whether an article code is outputted from the barcode scanner 203 (step S108). When the controller 253 determines there is an output of an article code from the barcode scanner 203 (Y of step S108), the controller 253 transmits a reading request of a characteristic data which accompanies the article code outputted by the barcode scanner 203 to the store controller 31, receives the characteristic data transmitted from the store controller 31 and takes the data into the RAM 254 (step S109). On this occasion, the store controller 31 accesses to the article characteristic database and searches an exterior characteristic data of an article, which corresponds to the received article code. The obtained characteristic data constitutes the second data.

The controller 253 compares the characteristic data of the article (the first data) extracted at the step S107 and the exterior characteristic data of the article (the second data) obtained at the step S109 and determines a consistency between the two pieces of data (step S110). In this comparing process, it is determined there is a consistency when a gap between the characteristic value included in the characteristic data of the article extracted in the step S107 (the first data) and the characteristic value included in the exterior characteristic data of the article obtained at the step S109 (the second data) is smaller than a predetermined established value, whilst it is determined there is not a consistency when the gap is bigger than the predetermined established value.

Then, the controller 253 allows the process to return to the step S102 and the processes between the steps S102 to S111 are repeated when it is determined there is a consistency between the characteristic data of the article extracted at the step S107 (the first data) and the exterior characteristic data obtained at the step S109 (the second data). On the other hand, when the controller 253 determines there is not a consistency between the characteristic data of the article extracted at the step S107 (the first data) and the exterior characteristic data of the article obtained at the step S109 (the second data) (N of step S111), the controller 253 executes an alarming process (step S112). That is, the controller 253 stops a progress of the article sales data processing and changes an emission color of the emission part 218 provided at the tip of the display pole 217 from blue to red to generate an alarming, and in addition, transmits an alarming signal to the attendant terminal 501 via the communication interface 261.

Figure 13:
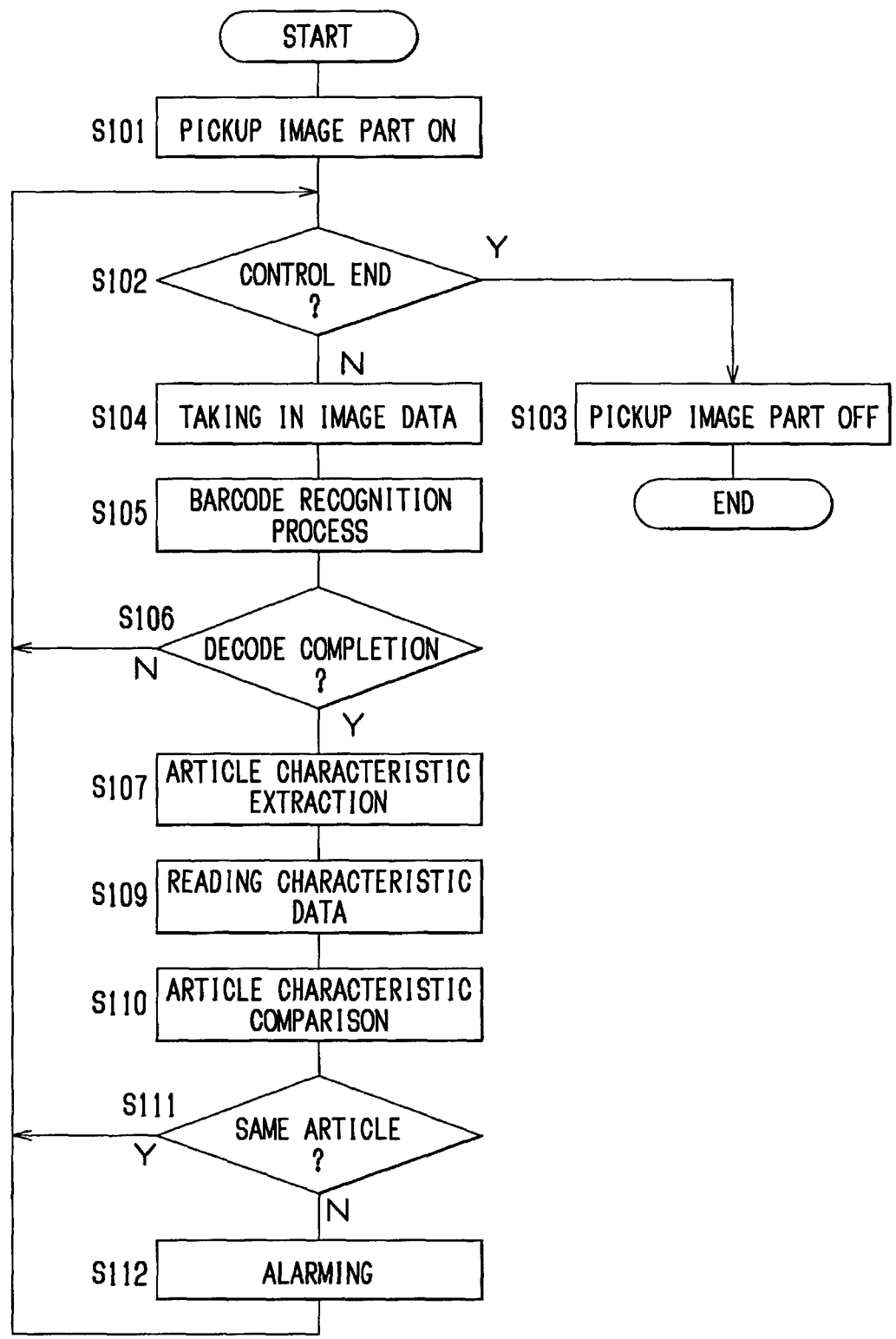
FIG. 13 is a flowchart showing a flow of another embodiment of a form check process including the first determination process.

FIG. 13 is a flowchart showing a flow of the form check process of another embodiment including the first determination process of another embodiment. A difference of the process shown in FIG. 13 from the process shown in FIG. 12 is an obtaining technique of an article code. The process shown in FIG. 13 does not use the article code outputted by the barcode scanner 203, but utilizes pickup image data outputted by the watch camera 205 which has been taken into the RAM 254 at the step S104 as an article code to be used in the form check process.

The controller 253 executes a barcode recognition process based on the pickup image data outputted by the watch camera 205 which was taken into the RAM 254 (step S105). The barcode recognition process is executed by referring a barcode database, which is installed to the HDD 258 and copied to the RAM 254, for example. The barcode database stores a relationship between a code and various elements characterizing a barcode which corresponds to the code, for example. Thereby, the controller 253 analyzes the barcode included in the pickup image data taken in to the RAM 254 at the step S104, extracts the various elements characterizing the barcode and accesses to the barcode database to obtain a code corresponding to the extracted elements. Then, the controller 253 decodes the obtained barcode and obtains an article code.

When the controller 253 determines a completion of the decoding process for obtaining the article code (Y of step S106), the controller 253 executes the extraction process of a characteristic data of the article at the step S107. Since the article code has been already obtained at the step S105, the process for determining whether the article code is outputted or not by the barcode scanner 203 (step S108 in FIG. 12) is not executed, and the process goes on to the reading process of the characteristic data at the step S109. Here, the controller 253 uses the article code obtained at the step S105 as the article code which accompanies with the reading request of the characteristic data to be transmitted to the store controller 31.

Processes after the step S109 are common with the processes shown in FIG. 12.

Now, the form check process including the second determination process will be explained. The second determination process executes a process for obtaining the number of the article as the first data, the exterior characteristic of which has been extracted based on the exterior characteristic of the article by the extraction process for extracting an exterior characteristic of an article from a pickup image data outputted by the watch camera 205, a process for obtaining the number of the article code outputted by the barcode scanner 203 as the second data, and a process for determining there is a consistency when the number of the article which the obtained first data specifies, and the number of the article which the obtained second data specifies have a consistency.

Figure 14:
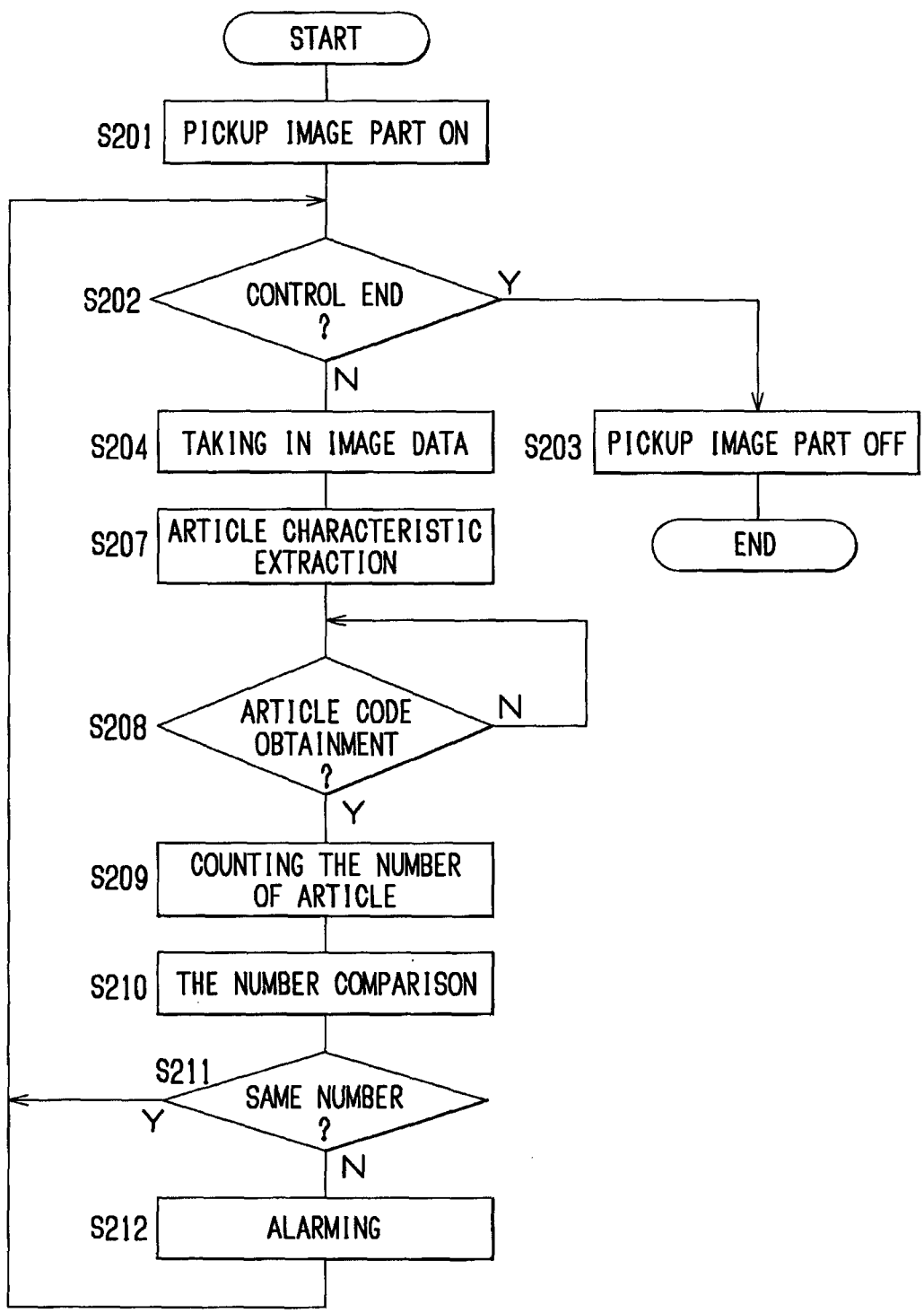
FIG. 14 is a flowchart showing a flow of a form check process including a second determination process.

FIG. 14 is a flowchart showing a flow of the form check process including the second determination process. The controller 253 outputs ON signal to the watch camera 205 when either selection buttons A1 or A2 shown in FIG. 10(B) is touched and assigned to start a self-checkout process (step S201). Thereby, a pickup image operation by the watch camera 205 is started. The pickup image operation continues until a termination command is determined (step S202). When the settlement button B23 displaying [SETTLEMENT] in the user area B2 in the first initial display B shown in FIG. 10(D) is touched and assigned, the controller 253 generates the termination command. The touching assignment of the settlement button B23 means a closing assignment. This will be explained later. The controller 253 outputs OFF signal to the watch camera 205 (step S203) according to the termination command (Y of step S202). Thereby, the pickup image operation by the watch camera 205 is over.

When the termination command is not determined (N of step S202), the controller 253 takes the pickup image data outputted by the watch camera 205 into the RAM 254 (step S204). Then, the controller 253 executes a process for counting the number of the article based on the pickup image data taken into the RAM 254. That is to say, the controller 253 extracts a characteristic of the article from the pickup image data taken into the RAM 254 as a characteristic data. The characteristic data to be extracted is data that a silhouette of the article, a color of the package, a pattern, a letter, a trademark and so on are evaluated as characteristic values, for example. The processes are executed by applying a well-known image processing technology. Then, the number of the article, the characteristic data of which has been extracted, are counted. The number of the article constitutes the first data.

To be important, the number of the article obtained as the first data is obtained based on the pickup image data outputted by the watch camera 205 within a established time in one transaction. The established time in this case is a sufficient time for more than two articles to pass through the reading surface 203a of the barcode scanner 203 by one barcode scanning operation.

Followed by the counting process of the number of article (step S207), the controller 253 allows the process to go to a process for determining whether an article code is obtained or not, that is, the controller 253 stands by for a determination whether an article code is outputted from the barcode scanner 203 (step S208). When an output of an article code from the barcode scanner 203 is determined (Y of step S208), the controller 253 executes a counting process for counting the number of the article, which has been obtained within the established time adopted at the step S207 (step S209). The number of the article constitutes the second data.

The controller 253 executes a number comparing process for comparing the number of the article counted at the step S207 (the first data) and the number of the article code counted at the step S209 (the second data) (step S210). In the number comparing process, the controller 253 determines there is a consistency when the number of the article which the first data specifies accords with the number of the article code which the second data specifies, whilst it is recognized there is not a consistency when the numbers do not accord with each other.

Then, when the controller 253 determines the number of the article counted at the step S207 (the first data) accords with the number of the article code counted at the step S209 (the second data) (Y of step S211), the controller 253 allows the process to return to the step S202 and the processes between the steps S202 to S211 are repeated. On the other hand, when the controller 253 determines the number of the article counted at the step S207 (the first data) does not accord with the number of the article code counted at the step S209 (the second data) (N of step S211), the controller 253 executes an alarming process (step S212). That is, the controller 253 stops a progress of the article sales data processing, changes an emission color of the emission part 218 provided at the tip of the display pole 217 from blue to red, and transmits an alarming signal to the attendant terminal 501 via the communication interface 261.

Figure 15:
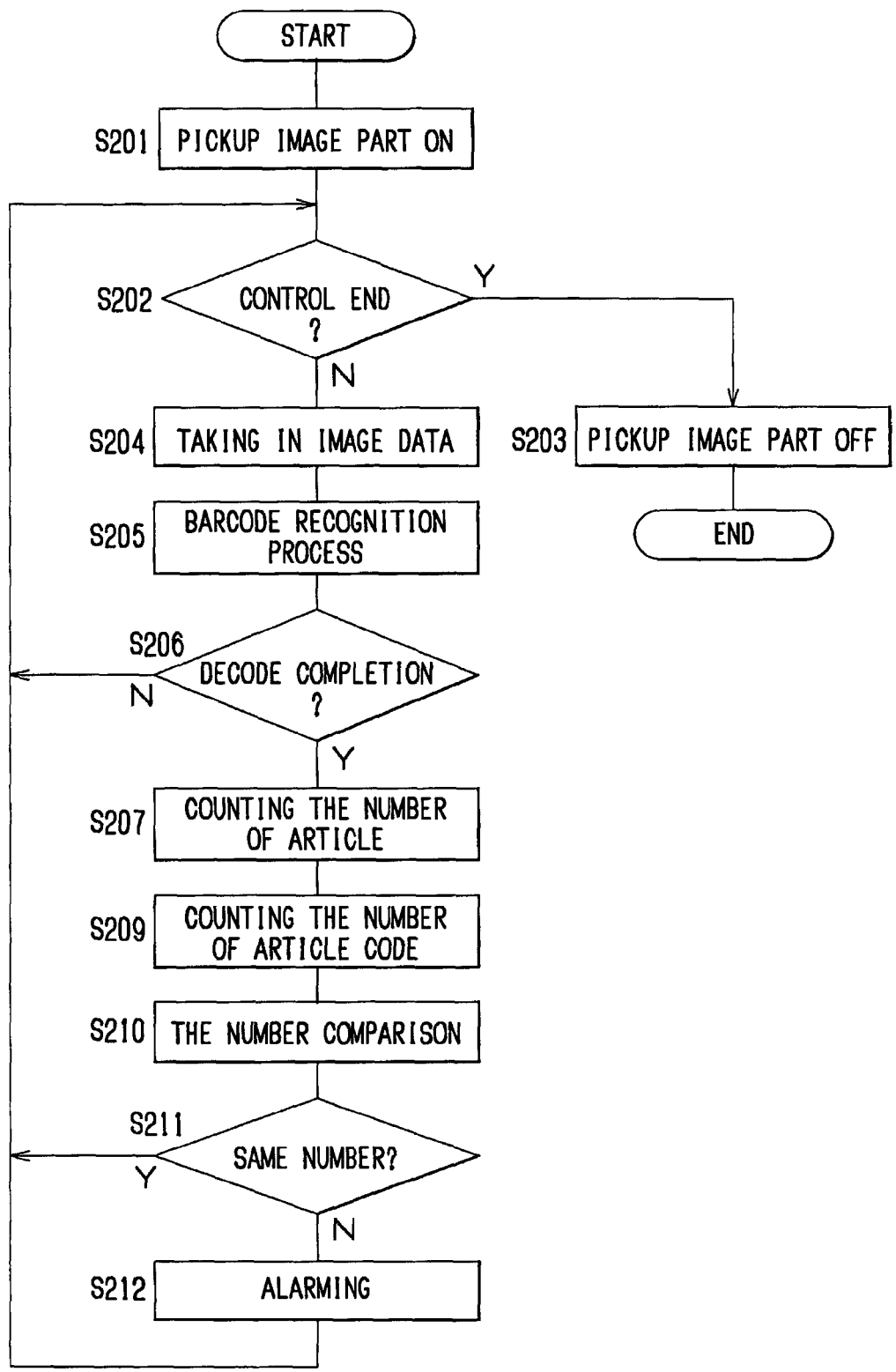
FIG. 15 is a flowchart showing a flow of another embodiment of a form check process including the second determination process.

FIG. 15 is a flowchart showing a flow of the form check process including the second determination process of another embodiment. A difference of the process shown in FIG. 15 from the process shown in FIG. 14 is an obtaining technique of an article code. The process shown in FIG. 15 does not adopt an article code outputted by the barcode scanner 203 as an article code to be used in the form check process, but utilizes the pickup image data outputted by the watch camera 205, which has been taken into the RAM 254.

The controller 253 executes a barcode recognition process based on the pickup image data outputted by the watch camera 205 which was taken into the RAM 254 (step S205). The barcode recognition process is executed by referring a barcode database, which is installed to the HDD 258 and copied to the RAM 254, for example. The barcode database stores a relationship between a code and various elements characterizing a barcode which corresponds to the code, for example. Thereby, the controller 253 analyzes the barcode included in the pickup image data taken into the RAM 254 at the step S204, extracts the various elements characterizing the barcode and accesses to the barcode database to obtain a code corresponding to the extracted elements. Then, the controller 253 decodes the obtained barcode and obtains an article code.

When the controller 253 determines a completion of the decoding process for obtaining the article code (Y of step S206), the controller 253 executes the extraction process of a characteristic data of the article at the step S107. Since the article code has been already obtained at the step S105, the process for determining whether the article code is outputted or not by the barcode 203 (step S208 in FIG. 14) is not executed, and the process goes on to the reading process of the characteristic data at the step S209. Here, the controller 253 uses the article code obtained at the step S105 as the article code which accompanies with the reading request of the characteristic data to be transmitted to the store controller 31.

Processes after the step S210 are common with the processes shown in FIG. 14.

Figure 16:
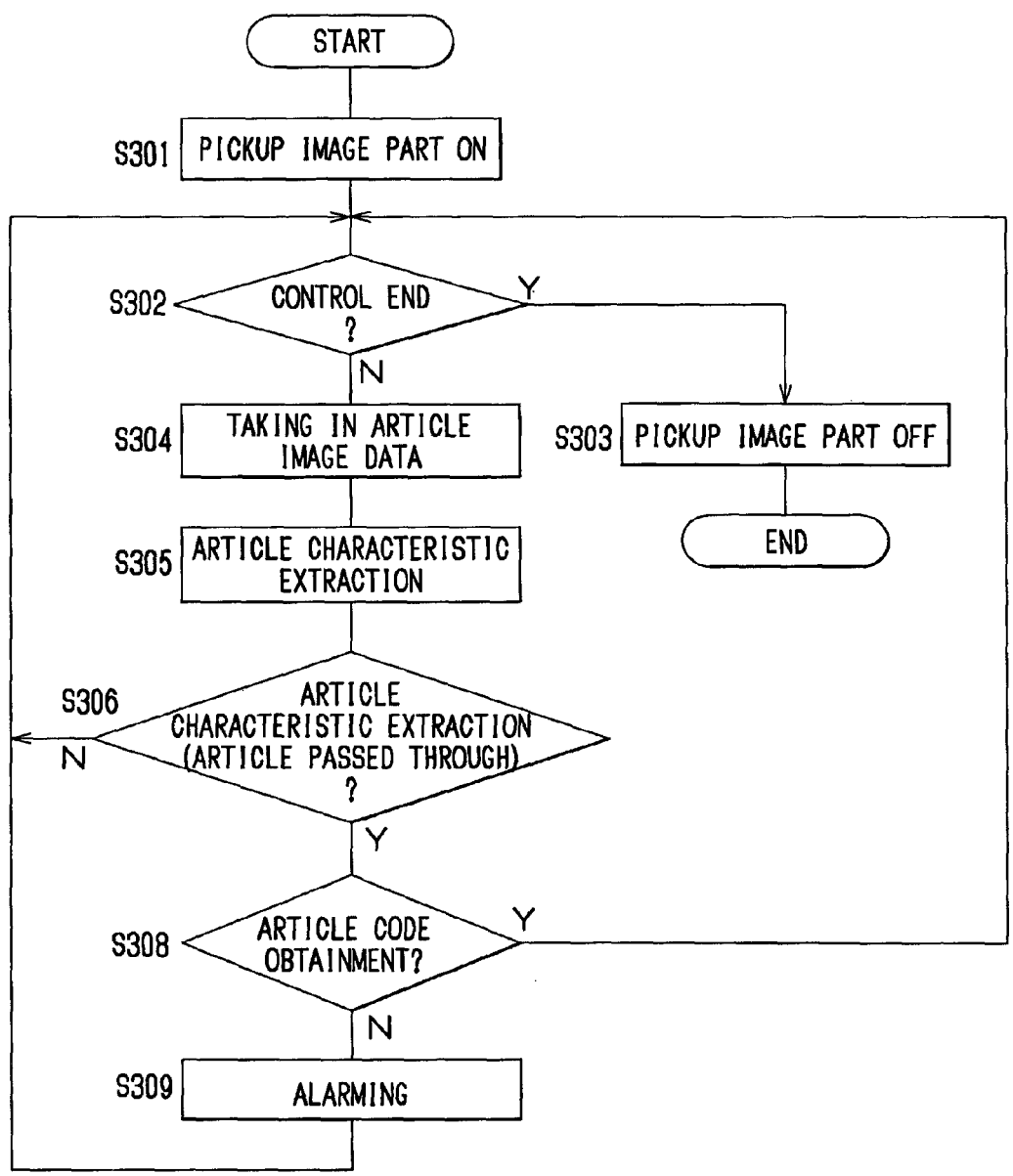
FIG. 16 is a flowchart showing a flow of a form check process including a third determination process.

Now, the form check process including the third determination process will be explained. FIG. 16 is a flowchart showing a flow of the form check process including the third determination process. The controller 253 outputs ON signal to the watch camera 205 when either selection buttons A1 or A2 shown in FIG. 10(B) is touched and assigned to start a self-checkout process (step S301). Thereby, a pickup image operation by the watch camera 205 is started. The pickup image operation continues until a termination command is determined (step S302). When the settlement button B23 displaying [SETTLEMENT] in the user area B2 in the first initial display B shown in FIG. 10(D) is touched and assigned, the controller 253 generates the termination command. The touching assignment of the settlement button B23 means a closing assignment. This will be explained later. The controller 253 outputs OFF signal to the watch camera 205 (step S303) according to the termination command (Y of step S302). Thereby, the pickup image operation by the watch camera 205 is over.

When the termination command is not determined (N of step S302), the controller 253 takes the pickup image data outputted by the watch camera 205 into the RAM 254 (step S304). Then, the controller 253 executes a process for extracting a characteristic of the article from the pickup image data which has been taken in to the RAM 254 as characteristic data (step S305). The characteristic data to be extracted is data that a silhouette of the article, a color of the package, a pattern, a letter, a trademark and so on are evaluated as characteristic value, for example. The processes are executed by applying a well-known image processing technology.

The extraction of the characteristic of the article at the step S305 means that a scanning operation of the article by the barcode scanner 203 has been executed. That is to say, the article has passed through the reading space, a frontal space of the reading surface 203a of the barcode scanner 203. Therefore, the controller 253 determines the execution of the scanning operation of the article by seeing the characteristic extraction of the article at the step S305 (step S306). The extraction process of the characteristic of the article at the step S305, in other words, the execution of the scanning operation of the article constitutes the first data.

When the controller 253 determines the execution of the scanning operation of the article (Y of step S306), the controller 253 allows the process to go to a process for determining whether an article code is outputted or not, that is, the controller 253 stands by for determining whether an article code is outputted from the barcode scanner 203 or not (step S308). On this occasion, an output of an article code by the barcode scanner 203, that is, a determination of an output of an article code from the barcode scanner 203 constitutes the second data.

A relationship between the first data and the second data will be explained. When an article is scanned at a situation where a barcode affixed to the article faces the reading surface 203a of the barcode scanner 203, the determination of an execution of a scanning operation of the article at the step S306 (the first data) and the determination of an output of the article code from the barcode scanner 203 at the step S308 occur synchronically within a momentary time. Here, the controller 253 recognizes there is a consistency between the first data and the second data when the determination of the execution of the scanning operation of the article at the step S306 (the first data) synchronically occurs with the determination of the output of the article code from the barcode scanner 203 at the step S308, whilst, the controller 253 recognizes there is not a consistency between the first data and the second data when the determinations does not occur synchronically. Here, when the controller 253 recognizes there is a consistency between the first data and the second data (Y of step S308), the controller 253 allows the process to return to the step S302 and the processes between the steps S302 to S308 is repeated. On the other hand, when the controller 253 recognizes there is not a consistency between the first data and the second data (N of the step S308), an alarming process is executed (step S309). That is, the controller 253 stops a progress of an article sales data processing and changes an emission color of the emission part 218 provided at the tip of the display pole 217 from blue to red to generate an alarming, and transmits an alarming signal to the attendant terminal 501 via the communication interface 261.

Figure 17:
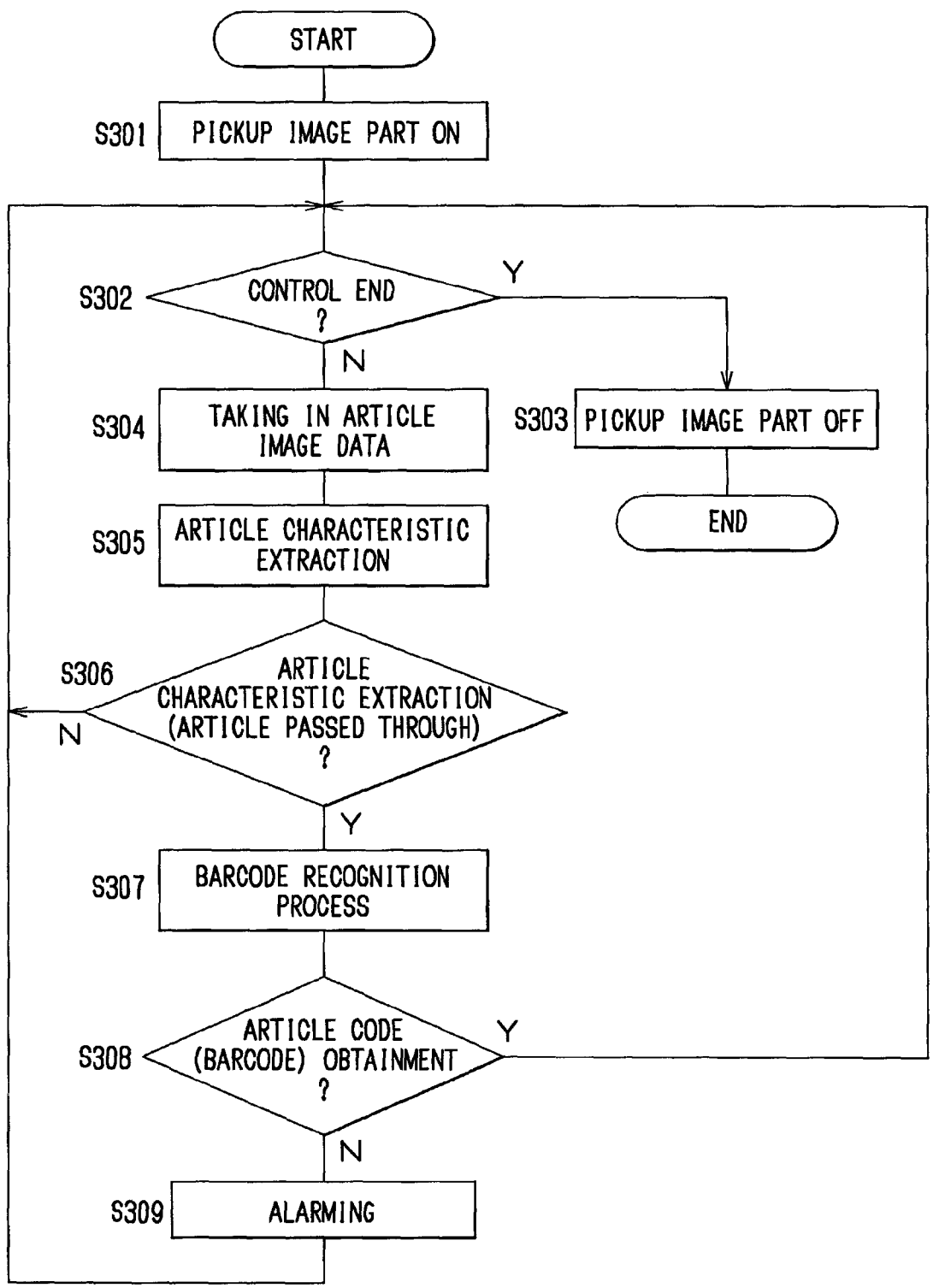
FIG. 17 is a flowchart showing a flow of another embodiment of a form check process including the third determination process.

FIG. 17 is a flowchart showing a flow of the form check process of another embodiment including the third determination process. A difference of the process shown in FIG. 17 from the process shown in FIG. 16 is an obtaining technique of an article code. The process shown in FIG. 17 does not adopt the article code outputted by the barcode scanner 203, but utilizes pickup image data outputted by the watch camera 205 which has been taken in to the RAM 254 at the step S304 as an article code to be used in the form check process.

The controller 253 executes a barcode recognition process based on the pickup image data outputted by the watch camera 205 which was taken into the RAM 254 (step S304) after the determination of a scanning operation of an article at the step S306. The barcode recognition process is executed by referring a barcode database, which is installed to the HDD 258 and copied to the RAM 254, for example. The barcode database stores various elements which characterize a barcode by corresponding to a code, for example. Thereby, the controller 253 analyzes the barcode included in the pickup image data taken into the RAM 254 at the step S304, extracts the various elements characterizing the barcode, and accesses to the barcode database to obtain a code corresponding to the extracted elements. To be important, the barcode recognition process does not obtain the article code by decoding a code symbol, namely, a barcode, but does recognize an existence of barcode itself. Therefore, a barcode recognized at the barcode recognition process at the step S307 can be referred as an article code even though the barcode actually does not constitutes the article code. Then, if a barcode (an article code which can be referred as an article code) is extracted from the pickup image data which has been taken in to the RAM 254 at the step S304 (Y of step S308), this constitutes the second data.

Here, if the controller 253 extracts a barcode (an article code which can be referred as an article code) from the pickup image data which has been taken into the RAM 254 at the step S304 (Y of step S308), the first data and the second data are recognized to have a consistency, whilst if a barcode cannot be extracted, it is recognized there is not a consistency. Needless to say, the barcode extraction determination (the second data) at the step S308 is periodically synchronized with the determination (the first data) of the scanning operation of an article at the step S306.

Processes after the step S308 are common to the processes shown in FIG. 16.

(4) Weight Check Process (i) Details of the Weight Check Process

Figure 18:
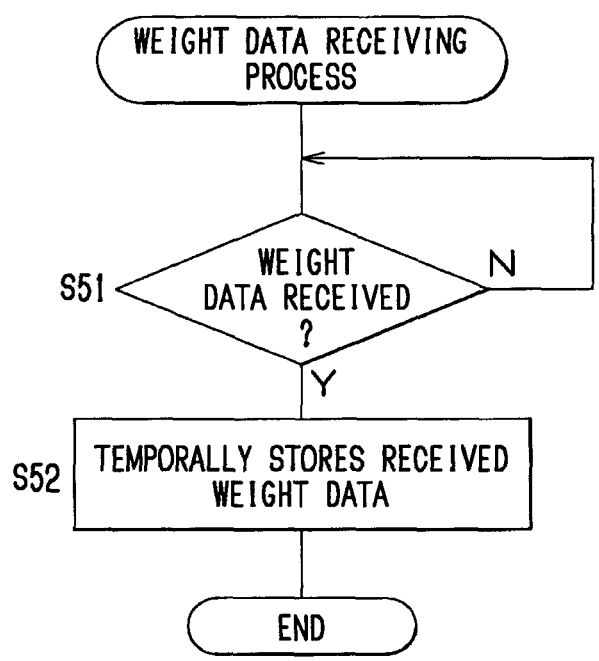
FIG. 18 is a flow chart showing a flow of a receiving process of weight data obtained from the scale device, the flow is included in a weight check process.

FIG. 18 is a flowchart showing a flow of a weight data receiving process from the scale device 301, which is included to the weight check process. The scale device 301 transmits the weighed result by the load cell unit 351 as the weight data to the self-checkout terminal 101. Here, the controller 253 of the self-checkout terminal 101 stands by for receiving the weight data when a start of the self-checkout process is touched and assigned by the selection button A1 in the first initial guidance display A shown in FIG. 10(B) through the touch panel 211 (step S51).

As described above, a transmission of the weight data from the scale device 301 to the settlement terminal 201 is executed periodically in a short circle such as few microseconds to few hundred microseconds. At the receiving process of step S51 in the flowchart shown in FIG. 18, whenever there is a transmission from the scale device 301 to the settlement terminal 201, it is always determined that a transmission is received.

When the controller 253 of the settlement terminal 201 determines there is a transmission of the weight data (Y of step S51), the controller 253 stores the received weight data to the RAM 254 temporally (step S52). That is, the controller 253 of the settlement terminal 201 stores the weight data to the RAM 254 temporally, which is transmitted from the scale device 301 periodically in a short cycle such as few microseconds to few hundred microseconds (step S52).

As the weight check process, the controller 253 acquires an increased weight value by subtracting a weight value specified by a weight data temporally stored just before the step S52 in the RAM 254 from a weight value specified by a weight data temporally stored in the RAM 254 at the step S52 in FIG. 18 to obtain an increased value. On this occasion, the controller 253 must have executed the search process (step S12 in FIG. 9) just before the step S52. That is, the controller 253 must have searched the PLU file PF and the weight data file WDF (FIG. 7(A) and FIG. 7(B)) based on an article code outputted by the barcode scanner 203, and must have obtained a price corresponding to the article code, a weight permissible range (a range between an upper limit value and a lower limit value, for example) and an article display. Therefore, the controller 253 determines whether the increased weight acquired by subtracting the weight value specified by the weight data temporally stored just before the step S52 in the RAM 254 from the weight value temporally stored in the RAM 254 at the step S52 in FIG. 18 falls within the weight permissible range (the range between the upper limit value and the lower limit value, for example) obtained by the search process (step S12 in FIG. 9). Thereby, the weight check process is executed.

(ii) Skip of the Weight Check Process

FIGS. 19(A) and 19(B) are exemplary diagrams showing a basic display B and a reading confirmation display C of a weight check exempted article. As described above, the settlement terminal 201 has the definition of whether a weight check is executed or not. Therefore, the controller 253 refers the definition of whether a weight check is executed or not, and for an article defined not to be executed the weight check, a confirmation button X is displayed on the reading confirmation display C and the weight check process is skipped. Then, when the confirmation button X is assigned by the touch panel 211 at the reading confirmation display C, the controller 253 allows the article sales data processing to proceed, returns the brightness of the user area B2 in the basic display B and cancels the reading confirmation display C. Thereby, the display of the LCD 210 returns to the basic display B shown in FIG. 10(D).

As can be seen, the weight check process is skipped for the weight check exempted article. As shown in FIG. 19(A), in spite of skipping the weight check process, the guidance display area B1 after the barcode affixed to the article is read displays a guidance showing an explanation that "Please bag the article into a shopping bag or my basket and touch the confirmation button" with a picture for assisting the explanation.

Here, as explained based on FIG. 11, the guidance display area B1 displays the placing location for the article after the barcode is read, according to the article placing location definition (the article bagging skip) of the weight data file WDF. Therefore, as shown in FIG. 19(B), the controller 253 makes the guidance display area B1 to display an explanation that "Please place the article beside the shopping bag table and touch the confirmation button" with a picture for assisting the explanation for the article, the placing location of which is defined as the floor by the article placing location definition (the article bagging skip).

(5) Article Information Registration Through Display Input

Going back to the explanation based on FIGS. 10(A)-10(I), as described above, the first initial guidance display A in FIG. 10(B) displays an explanation that "An article without a barcode will be registered at the next display" with a picture depicting "the next display". By this, the controller 253 prepares article assignment buttons B22, which consist of six touch buttons that "Vegetables", "Fruits", "Prepared Food", "Fish", "others", and "Packed Food" in the user area B2 in the basic display B in FIG. 10(D) as an image for registration of an article without a barcode. Here, when an article to be purchased does not have a barcode, a customer touches and assigns the article assignment buttons B22 through the touch panel 211. Upon an assignment of any of the article assignment button B22 through the touch panel 211, the transaction information B21 of the user area B2 in the basic display B is switched and a category selection display E as shown in FIG. 10(F) is displayed.

The category selection display E in FIG. 10(F) shows an example that "Prepared Food" is assigned through the touch panel 211. In this case, sixteen kinds of various foods included in the "Prepared Food" category is displayed by a scrolling display in four by four array in rows and columns. The category selection display E displays a return button E1. When the return button E1 is assigned through the touch panel 211, the category selection display E is switched and displayed to the transaction information B21, and is returned to the basic display B in FIG. 10(D).

When the transaction information B21 of the user area B2 in the basic display B is switched and the category selection display E shown in FIG. 10(F) is displayed, the controller 253 lets the guidance display area B1 to display an explanation that "Please touch the button of the article you have" with a picture for assisting the explanation. By this, the customer can get to know what operation he/she would do next.

Thus, when the customer touches and assigns one food through the touch panel 211 from the category selection display E in FIG. 10(F) according to the guidance, a category registration display F for the touched and assigned food appears on the user area B2 in the basic display B as shown in FIG. 10(G). The category registration display F in FIG. 10(G) shows an example that "Egg Tofu" is touched and assigned. In this case, the category registration display F regarding "Egg Tofu" appears. The category registration display F includes the transaction information such as the article price, a discount price, a quantity to be purchased, and the purchased price. The category registration display F also includes a character based on text data of a name regarding the article, a picture based on image data regarding the article, and numeric keys. The numeric keys enable to change an input of the quantity to be purchased for the article that the default setting is 1. These various kinds of data is cited from information recorded in the category file, which is separately provided in the settlement terminal 201 from the PLU file PF. Also, a cancellation button F1 and a decision button F2 are included in the category registration display F. When the cancellation button F1 is touched and assigned through the touch panel 211, the category registration display F (FIG. 10(G)) returns to the display E (FIG. 10(F)) in which the category selection display E of the user area B2 in the basic display B is displayed.

When the category registration display F is displayed on the user area B2 in the basic display B in FIG. 10(G), the controller 253 lets the guidance display area B1 to display an explanation that "Please input by the numeric key and touch "Decision" button when change the quantity" with a picture for assisting the explanation. Thereby, the customer can get to know what operation he/she would do next.

Thus, according to the guidance, when the customer inputs and changes a purchase number with the numeric keys as necessary at the category registration display F as shown in FIG. 10(G), and then touches and assigns the decision button F2 through the touch panel 211, the category registration of the selected food, "Egg Tofu" in the example shown in FIG. 10(G), is registered by the default number or the quantity changed with the numeric keys. Here, the controller 253 reduces the brightness of the basic display B displayed on the LCD 210, generates the reading confirmation display C, and laps the generated reading confirmation display C over the user area B2 as shown in FIG. 10(H). Additionally, the controller 253 transits the display in the guidance display area B1 in the basic display B into a guidance display that "please bag the article into the shopping bag or my basket" as shown in FIG. 10(H). Although not shown in FIG. 10(H), the controller 253 also transits the picture for assisting the operation to bag the article into the shopping bag or my basket shown in the guidance display area B1. By displaying the reading confirmation display C not to be lapped over the guidance display area B1, it is possible for the customer to confirm the guidance display and its transition in the guidance display area B1 easily.

Here, when the five kinds of the article assignment buttons B22 of "Vegetables", "Fruits", "Fish", and "Others" are touched and assigned through the touch panel 211, that is, all buttons except "Packed Food" of the article assignment buttons B22 are touched and assigned, and the category registration is executed after the reading confirmation display C is displayed to lap over the user area B2 in the basic display B, the weight check process is executed. That is, this process is common with to the process after the barcode affixed to the article, is read by the barcode scanner 203. Thus, an explanation of following processes will be omitted.

(6) Settlement

Continuing with the explanation based on FIGS. 10(A)-10(I), the settlement button B23 showing "Settlement" is displayed on the user area B2 in the basic display B as shown in FIG. 10(D). An assignment of the settlement button B23 means a closing assignment. Thus, when the settlement button B23 is touched and assigned through the touch panel 211, the controller 253 executes a settlement process. That is, the controller 253 generates a settlement display J and displays it on the user area B2 as shown in FIG. 10(I). The settlement display J includes a display of total sum, selection buttons J1 to J5 for paying methods, a return button J6 showing "Return to the detailed display" for returning to the first initial display B in FIG. 10(D). In FIG. 10(I), the selection button J1 is for cash, the selection button J2 is for a credit card, the selection button J3 is for a non-contacting IC card of an electronic money type, the selection button J4 is for a non-contacting IC card charging to a bank account and the selection button J5 is for a gift coupon. Thereby, when the customer touches and assigns the settlement button B23 through the touch panel 211 at the settlement terminal 201, the controller 253 executes a settlement process by cash, an electro-magnetic card such as a credit card, an electronic money type non-contacting IC card, or a bank account charging type non-contacting IC card, for the settled amount obtained through the article sales data processing.

Obviously, numerous modifications and variations of the present invention are possible in light of the above teachings. It is therefore to be understood that within the scope of the appended claims, the invention may be practiced otherwise than as specifically described herein.

What is claimed is:

1. A checkout terminal, comprising:
an article code reading device configured to read a code symbol affixed to an article, decode an article code, and output the article code;
a pickup image part configured to pick up an image of an area where the article, the code symbol of which is read by the article code reading device, is positioned, and output a picked-up image data;
a first module configured to execute a search process and an article registration process, the search process searching an article data file, which stores a price corresponding to each article code, for a price of the article when the article code reading device reads the code symbol;
a second module configured to execute an extraction process to extract an exterior characteristic of the article from the picked-up image data outputted by the pickup image part;
a third module configured to determine a consistency between a first data based on the extracted exterior characteristic of the article and a second data based on the output from the article code reading device; and
a fourth module configured to stop a progress of the article registration process and a progress of the search process when the third module determines that there is not a consistency between the first data and the second data,
wherein the third module is configured to (i) obtain a number of articles whose exterior characteristics are extracted by the extraction process as the first data, (ii) obtain a number of article codes outputted by the article code reading device as the second data, and (iii) compare the number obtained as the first data and the number obtained as the second data to determine whether the first data and the second data are consistent with each other, and
wherein the number of articles obtained as the first data is obtained based on picked-up data outputted by the image pickup part within an established time of one transaction, the established time of one transaction corresponding to an amount of time sufficient for a plurality of the articles to pass through the article code reading device during one code symbol reading operation, and the number of article codes obtained as the second data is obtained based on the number of article codes outputted by the article code reading device within the established time.

2. The checkout terminal, according to claim 1, wherein the third module is configured to execute:
a process to obtain an exterior characteristic of an article extracted by the extraction process as the first data,
a process to obtain a corresponding characteristic data from an article characteristic database which stores an exterior characteristic of an article which correspond to the article code outputted by the article code reading device, and a process to determine there is a consistency between the obtained first data and the obtained second data if there is a consistency between the two data, and to determine there is not a consistency between the obtained first data and the obtained second data if there is not a consistency between the two data.

3. The checkout terminal, according to claim 2, wherein the third module is configured to further execute:
   a process to obtain the number of an article, an exterior characteristic of which is extracted, based on the exterior characteristic extracted by the extraction process as the first data,
   a process to obtain the number of an article code outputted by the article code reading device as the second data, and
   a process to determine there is a consistency between the number specified by the obtained first data and the number specified by the obtained second data if there is a consistency between the two pieces of data, and to determine there is not a consistency between the number specified by the obtained first data and the number specified by the obtained second data if there is not a consistency between the two pieces of data.

4. The checkout terminal, according to claim 3, wherein the third module is configured to further execute:
   a process to obtain an extraction of an exterior characteristic of an article by the extraction process as the first data;
   a process to obtain an output of the article code by the article code reading device as the second data; and
   a process to determine there is a consistency between the first data and the second data if the second data is obtained synchronously with the first data, and to determine there is not a consistency if the second data is not obtained synchronously with the first data.

5. The checkout terminal, according to claim 4, wherein it is determined there is a consistency between the first data and the second data if a gap between a characteristic value included in the first data and a characteristic value included in the second data is smaller than an established data, and for determining there is not a consistency between the first data and the second data if the gap is bigger than the established data.

6. The checkout terminal, according to claim 3, wherein it is determined there is a consistency between the first data and the second data if a gap between a characteristic value included in the first data and a characteristic value included in the second data is smaller than an established data, and for determining there is not a consistency between the first data and the second data if the gap is bigger than the established data.

7. The checkout terminal, according to claim 2, wherein the third module is configured to further execute:
   a process to obtain an extraction of an exterior characteristic of an article by the extraction process as the first data;
   a process to obtain an output of the article code by the article code reading device as the second data; and
   a process to determine there is a consistency between the first data and the second data if the second data is obtained synchronously with the first data, and to determining there is not a consistency between the first data and the second data if the second data is not obtained synchronously with the first data.

8. The checkout terminal, according to claim 7, wherein it is determined there is a consistency between the first data and the second data if a gap between a characteristic value included in the first data and a characteristic value included in the second data is smaller than an established data, and for determining there is not a consistency between the first data and the second data if the gap is bigger than the established data.

9. The checkout terminal, according to claim 2, wherein it is determined there is a consistency between the first data and the second data if a gap between a characteristic value included in the first data and a characteristic value included in the second data is smaller than an established value, and it is determined there is not a consistency if the gap is bigger than the established value.

10. The checkout terminal, according to claim 1, wherein the third module is configured to further execute:
    a process to obtain an extraction of an exterior characteristic of an article by the extraction process as the first data;
    a process to obtain an output of the article code by the article code reading device as the second data; and
    a process to determine there is a consistency between the first data and the second data if the second data is obtained synchronously with the first data, and to determine there is not a consistency between the first data and the second data if the second data is not obtained synchronously with the first data.

11. The checkout terminal, according to claim 1, further comprising:
    a user interface configured to enable an input, a display of various information, and a settlement process; and
    a fifth module configured to execute the settlement process for an article for which the article registration is executed, in response to a completion declaration of one transaction input with the user interface, wherein
    the fourth module is further configured to stop a progress of the settlement process when it is determined that there is not a consistency between the first data and the second data.

12. The checkout terminal, according to claim 1, further comprising:
    a scale device configured to provide a placing part for placing an article after the code symbol is read, to provide a weight of the article placed on the placing part, and to transmit the weighed weight value to the checkout terminal, wherein:
    the article data file includes a stored weight which corresponds to each article code,
    a weight check process is executed, the weight check process being for searching the article data file for a corresponding weight, obtaining a weight of an article placed on the placing part based on a weight value received from the scale device and determining a consistency between the stored weight and the weight of the article placed on the placing part, when a code symbol is read by the article code reading device,
    the article registration process is executed only when a consistency between the searched weight and the weight of an article placed on the placing part is determined as a result of the weight check process, and
    the fourth module is further configured to stop a progress of the weight check process when it is determined that there is not a consistency between the first data and the second data.

13. The checkout terminal, according to claim 12, further comprising:
    a user interface configured to enable an input, a display of various information, and a settlement process; and
    a fifth module configured to execute the settlement process for an article for which the article registration is executed, in response to a completion declaration of one transaction input with the user interface, wherein the fourth module is further configured to stop a progress of the settlement process when it is determined that there is not a consistency between the first data and the second data.

14. The checkout terminal, according to claim 1, further comprising:

an alarming device configured to generate an alarm; and a sixth module configured to allow the alarming device to generate an alarm when it is determined that there is not a consistency between the first data and the second data.

\* \* \* \* \*